(12) United States Patent
Yerli

(10) Patent No.: US 11,076,004 B2
(45) Date of Patent: Jul. 27, 2021

(54) VIRTUAL RADIO ACCESS NETWORK SYSTEM AND METHOD FOR OPTIMIZED REAL-TIME RESPONSIVE CONTINUOUS LOCATION-BASED CLOUD COMPUTING, RENDERING, TRACKING, AND COMMUNICATION SERVICES IN THREE-DIMENSIONAL SPACE THROUGH A DISTRIBUTED COMPUTING CENTER NETWORK

(71) Applicant: THE CALANY HOLDING S.Á R.L., Luxembourg (LU)

(72) Inventor: Cevat Yerli, Frankfurt am Main (DE)

(73) Assignee: THE CALANY HOLDING S.Á R.L., Luxembourg (LU)

( * ) Notice: Subject to any disclaimer, the term of this patent is extended or adjusted under 35 U.S.C. 154(b) by 0 days.

(21) Appl. No.: 16/546,015

(22) Filed: Aug. 20, 2019

(65) Prior Publication Data
US 2021/0058473 A1    Feb. 25, 2021

(51) Int. Cl.
*G06F 15/16* (2006.01)
*H04L 29/08* (2006.01)
(Continued)

(52) U.S. Cl.
CPC .......... *H04L 67/18* (2013.01); *H04L 41/5003* (2013.01); *H04L 47/82* (2013.01); *H04L 67/1095* (2013.01); *H04L 67/306* (2013.01)

(58) Field of Classification Search
CPC ... H04L 67/18; H04L 67/1095; H04L 67/306; H04L 41/5003; H04L 47/82
(Continued)

(56) References Cited

U.S. PATENT DOCUMENTS 9,999,030 B2 *  6/2018  Gu ..................... H04W 56/001
10,129,101 B2 *  11/2018  Luo ..................... H04L 41/5054
(Continued)

FOREIGN PATENT DOCUMENTS

WO    2017/187011 A1    11/2017

OTHER PUBLICATIONS

Network Slicing for 5G and Beyond, 5G Americas White Paper, Nov. 2016, 35 pages.
(Continued)

*Primary Examiner* — Moustafa M Meky
(74) *Attorney, Agent, or Firm* — Christensen O'Connor Johnson Kindness PLLC

(57) ABSTRACT

Systems and methods are provided for enabling optimized real-time responsive and continuous location-based services in three-dimensional space, including cloud computing, rendering, tracking, and communication through a distributed computing center network. The system includes distributed computing centers connected to data centers, wherein each computing center further comprises one or more cloud servers configured with computing resources sufficient to perform computing and rendering for one or more client devices, and wherein each data center further comprises one or more master servers with computing resources sufficient to perform application and user data storage, synchronization of digital reality data sent by cloud servers, and dynamic network slicing and quality of service management. Instructions to perform these methods are implemented in a digital reality virtual radio access network portion in cloud servers.

20 Claims, 27 Drawing Sheets

(51) Int. Cl.
*H04L 12/911* (2013.01)
*H04L 12/24* (2006.01)

(58) Field of Classification Search
USPC .......................................................... 709/223
See application file for complete search history.

(56) References Cited

U.S. PATENT DOCUMENTS

| | | | |
|---|---|---|---|
| 10,244,500 B2* | 3/2019 | Lu | H04W 60/00 |
| 10,425,530 B2* | 9/2019 | John | G06F 16/27 |
| 10,757,576 B2* | 8/2020 | Ashrafi | H04W 16/10 |
| 2008/0158076 A1 | 7/2008 | Walley | |
| 2010/0266287 A1 | 10/2010 | Adhikari et al. | |
| 2012/0296963 A1* | 11/2012 | Lu | H04W 84/00 709/203 |
| 2013/0150015 A1 | 6/2013 | Valkó et al. | |
| 2015/0334696 A1* | 11/2015 | Gu | H04L 61/2015 718/1 |
| 2016/0256775 A1* | 9/2016 | Gustafson | A63F 13/30 |
| 2017/0050111 A1* | 2/2017 | Perry | H04L 67/10 |
| 2017/0094018 A1 | 3/2017 | Ekström et al. | |
| 2017/0164349 A1 | 6/2017 | Zhu et al. | |
| 2018/0290054 A1* | 10/2018 | Perry | H04L 65/80 |
| 2018/0376338 A1* | 12/2018 | Ashrafi | H04W 16/10 |
| 2019/0141694 A1 | 5/2019 | Gupta et al. | |
| 2019/0149329 A1* | 5/2019 | Wu | H04W 4/70 713/155 |
| 2019/0174322 A1 | 6/2019 | Deviprasad et al. | |
| 2020/0052991 A1* | 2/2020 | Kodaypak | H04L 47/2416 |
| 2020/0206616 A1* | 7/2020 | Perry | H04L 67/38 |
| 2020/0396132 A1* | 12/2020 | Wang | H04L 41/0853 |

OTHER PUBLICATIONS

Li, Q., et al., "An end-to-end network slicing framework for 5G wireless communication systems", Aug. 2016, 13 pages.
Wallace, R., "Antenna Selection Guide," Application Note AN058, Texas Instruments, SWRA161B, Oct. 2010, 45 pages.
Gao, Y., "Massive MIMO Antenna Array Design and Challenges," Antennas & Electromagnetics Research Group, een Mary University of London, Apr. 2015, 15 pages.
Extended European Search Report dated Oct. 19, 2020, issued in corresponding European Application No. EP 20191248.2, 11 pages.

* cited by examiner

1100

SERVICE CONTEXT PARAMETERS

| PARAMETER | RANKING |
|---|---|
| CALLING | C |
| STREAMING VIDEOS | A |
| SHORT MESSAGE SERVICE (SMS) | E |
| DOWNLOADING/ UPLOADING FILES | D |
| DOWNLOADING/ UPLOADING VIDEOS | B |

FIG. 11

VIRTUAL RADIO ACCESS NETWORK SYSTEM AND METHOD FOR OPTIMIZED REAL-TIME RESPONSIVE CONTINUOUS LOCATION-BASED CLOUD COMPUTING, RENDERING, TRACKING, AND COMMUNICATION SERVICES IN THREE-DIMENSIONAL SPACE THROUGH A DISTRIBUTED COMPUTING CENTER NETWORK

BACKGROUND

Technology developments for providing digital content to users have enabled experiences that were not possible in the past. Particularly, digital reality, such as augmented reality (AR), virtual reality (VR), or mixed reality (MR), changes a user's perception on what they are seeing, hearing, and feeling, and how much of the real world comes into these experiences, providing the user with a sensation of a physical presence in places in the real world or an imagined world.

A typical way to accomplishing these more immersive interactive experiences is to use head-mounted digital reality devices. These devices may usually include a central processing unit (CPU), a graphics processing unit (GPU) for processing intensive graphics operations, a vector unit for performing geometry transformations, and other hardware, firmware, and software. However, highly dynamic and interactive applications such as those including AR, VR, and MR experiences are primarily downloaded and hosted on the client device side, resulting in high hardware demands to execute the applications. Additionally, to accommodate the GPUs and achieve their desired performance, high quality head-mounted digital reality devices are currently physically tethered to very powerful and expensive personal computers (PCs). These requirements create larger adoption barriers due to high price points and limited mobility, which detracts from the overall experience. Moreover, streaming complex, interactive AR, VR and MR 3D graphics require high data transfer rates.

Reducing hardware and network demands along with adoption barriers for AR, VR and MR motivates the desire to offload computationally intensive tasks to one or more powerful remote servers, or cloud servers. Typical applications dominant today (asynchronous or one-way-delivery applications like instant messaging, web page loading, etc.) which employ cloud computing can tolerate approximately 100 ms of latency, and are supported by existing network infrastructure, content delivery networks (CDN), and centralized cloud computing. Current architecture employed for remote rendering is optimized for the delivery of static, predefined content with minimal levels of dynamic interaction. However, dynamic AR, VR and MR applications require real-time interaction, and thus extremely low latency (around 7 ms), placing very high demands on the network and limiting the quality and variety of digital reality experiences that users may enjoy. In addition, these drawbacks prevent or limit the provision of continuous cloud computing, cloud rendering, tracking and communication services to client devices.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

One or more drawbacks described in the background are addressed by the current disclosure through a system and method for enabling optimized real-time responsive and continuous (or substantially continuous, allowing for occasional network latency problems or service interruptions) location-based services in three-dimensional space through a distributed computing center network. The location-based services include real-time cloud computing of digital reality data, real-time rendering of digital reality data, real-time tracking of client devices, or real-time communication, or combinations thereof. The system and method offloads computationally intensive tasks to cloud servers that cover specific physical areas, or server zones, located in the proximity of users' devices. Methods described herein comprise dynamic network slicing and quality of service (QOS) management, which may prove advantageous for optimizing computing power, system bandwidth, and antenna beam-forming and steering. In some embodiments, dynamic network slicing and QOS management also may be considered as location-based services in the three-dimensional space, in the sense that the actual provisioning of the service, the QOS, which server performs which functions, and at which levels, and the like, are also affected by and responsive to location of, e.g., the client devices. Instructions to perform the above methods may be embedded and performed in a digital reality virtual radio access network (VRAN) in the cloud server.

"Cloud computing" refers herein to storing and processing data, such as digital reality data, through cloud servers. "Cloud rendering" refers herein to the process of generating photorealistic images and experiences from scene files that may include geometries, viewpoints, textures, lighting, sounds, and other information through cloud servers. For example, a processor in the cloud server may render a stereoscopic representation of a three-dimensional representation of a scene, may provide binaural audio output, and may provide haptic output through the digital reality devices to provide haptic sensation to a user. Communication techniques disclosed herein include the transmission and retrieval of data such as digital reality data from cloud servers to digital reality devices and vice-versa through network signals emitted by network antennas. "Tracking" refers herein to determining position or orientation of objects or devices. Tracking may be used to refer to tracking of client devices (e.g., digital reality devices or other connected computing devices) which may be further used to adjust computing, rendering, and communication of the digital reality content. These services are provided based on location in three-dimensional space. Three-dimensional space may refer to space in the physical world, a virtual world, which may include virtual, mixed or augmented reality (VR, MR and AR), or both the physical world and a virtual world.

Client devices refer herein to digital reality devices such as head-mounted display devices, see-through devices, and smart contact lenses; or other connected computing devices, such as mobile devices, wearable devices, personal computers, laptops, gaming devices, or Internet of Things devices.

According to an embodiment, a wide area distributed computing center network (WADCCN) is configured to cover and service large geographical areas, where cloud computing, rendering, tracking, and communication services in three-dimensional space are provided to client devices. The WADCCN may include various distributed computing centers (DCCs), one or more of which are connected to data centers (DCs) and are synchronized by the DCs. Two or more communicatively connected and synchronized DCCs form a WADCCN system. In further embodiments, at least one DCC communicatively connected to at least one DC may form a synchronized DCC, which may be configured to cover and service smaller geographical areas. A synchronized DCC may include a plurality of computing centers (CCs) communicatively connected to each other and synchronized by a DC. The one or more DCs may include one or more master servers with computing resources sufficient to perform application and user data storage and synchronization received from different cloud servers located in CCs.

Data synchronization may include the process of maintaining the consistency and uniformity of digital reality applications data and user data across the different cloud servers from various server zones.

In an embodiment, a DCC may include between about two and about fifty CCs synchronized by one or more DCs. The DCs may include facilities to house computer systems and associated components, such as telecommunication and storage systems, power supplies, redundant data communication connections, environmental controls, and various security devices. DCs may be located in remote areas and may cover relatively large geographical extensions (e.g., cities, countries, or continents) in order to provide services to a plurality of DCCs. In further embodiments, CCs, which house the cloud servers, may be smaller versions of DCs, and thus may also include facilities to house computer systems and associated components. However, CCs may differ from DCs in that CCs may be located in more densely populated areas in order to be closer to users, and thus provide better service to the users with reduced latency and optimized QOS.

In an embodiment, network connection antennas may be configured in areas relatively close to CCs, DCs, or areas serviced by the CCs in order to provide them with network connection and tracking services. In these embodiments, the antennas are connected through wired means to the CCs and DCs. Similarly, the antennas may also be installed within the CCs, DCs, or areas serviced by the CCs.

In some embodiments, in order to reduce hardware and network demands, contribute to the reduction of network latency, and improve the general merged reality experience, the system may connect through a network including millimeter-wave (mmW) or combinations of mmW and sub 6 GHz communication systems, such as through 5th generation wireless systems communication (5G). In other embodiments, the system may connect through wireless local area networking (Wi-Fi) providing data at, for example, 16 GHz. Provided communication systems may allow for low end-to-end (E2E) latency and high downlink speeds to end points in the field, complying with parameters necessary for executing the typically highly-interactive digital reality applications or other highly-demanding applications. This results in high-quality, low latency, real-time digital application content streaming. In other embodiments, the system may communicatively connect through 4th generation wireless systems communication (4G), may be supported by 4G communication systems, or may include other wired or wireless communication systems.

According to an embodiment, operating systems embedded within the cloud servers include instructions that, when executed, enable a real-time responsive and continuous location-based cloud computing, rendering, tracking, and communication services of client devices in three-dimensional space. These operating systems may include network operating system (NOS) configured to connect antennas to cloud servers and to the client devices; a digital reality virtual radio access network (VRAN) configured to perform dynamic network slicing and quality of service management; and an experience operating system including data and instructions used by the digital reality VRAN in order to perform dynamic network slicing and quality of service management.

In an embodiment, the NOS embedded in the cloud server may include an Open Network Automation Platform (ONAP), which is an open source software platform that delivers capabilities for the design, creation, orchestration, monitoring, and life cycle management of virtual network functions (VNFs), carrier-scale Software Defined Networks (SDNs) included in the VNFs, and higher-level services that combine the above functions. ONAP provides for automatic, policy-driven interaction of these functions and services in a dynamic, real-time cloud environment, achieving both faster development and greater operational automation.

Implementation of the digital reality VRAN involves relocating processors originally located at the radio sites to CCs and DCs, and is implemented using virtual machines (VMs) on the cloud servers and master servers, decentralizing the functions at the radio sites and virtualizing network functions in the radio access network (RAN). Because several CCs and antennas are used in, but not limited to, densely populated areas, the digital reality VRAN of the current disclosure is allowed to perform an efficient scaling and pooling of network resources in the proximity of users, bringing network signals closer to users and avoiding typical drawbacks of mmW spectrum signals of antennas used in some embodiments of the current disclosure.

The experience OS includes data and instructions used by the digital reality VRAN to determine the processing required to control and provide network signals to client devices for dynamic network slicing and QOS management. In some embodiments, the experience OS receives, stores, processes, and provides data and instructions to the digital reality VRAN related to the number, position, and orientation of client devices that are to be serviced by an antenna as well as the context that affects each client device and each antenna and which may have an effect on the dynamic network slicing and QOS management.

According to an embodiment, the servers of the CCs include memory and a processor, the processor being configured to execute instructions and data stored in the memory. The memory stores in a database or data structure a persistent virtual world system modeled based on the real world. The persistent virtual world system includes virtual replicas of real world entities found in the real world. The persistent virtual world system may further comprise purely virtual objects not existing in the real world, and applications that users can view and interact with in the locations where they have been configured. The memory may further include a replica editor which may include software and hardware configured to enable users to model and edit the virtual replicas of the real world entities as well as purely virtual objects and graphical representations of applications. The replica editor may be, for example, a computer-aided drawing (CAD) software that may store data and instructions necessary to input and edit virtual replicas. The replica editor may enable the input of explicit data and instructions that relate to each virtual replica, which refers to data and instructions that describe the shape, location, position and orientation, physical properties, and the expected functioning and impact of each replica and the system as a whole. Generally, the explicit data may include data that may not be obtained by the sensing mechanisms but which instead may need to be input digitally through the replica editor, such as priority data, building materials, wall thicknesses, electric installations and circuitry, water pipes, fire extinguishers, emergency exits, window locations, machine performance parameters, machine sensor and valve locations, etc. In some embodiments the VRAN performs the dynamic network slicing and quality of service management based on data from the persistent virtual world system.

In the current disclosure, the term "persistent" is used to characterize a state of a system that can continue to exist without a continuously executing process or network connection. For example, the term "persistent" may be used to characterize the virtual world system where the virtual world system and all of the virtual replicas, or other objects such as purely virtual objects and applications therein comprised continue to exist after the processes used for creating them cease, and independent of users being connected to the virtual world system. Thus, the virtual world system is saved in non-volatile storage location in the cloud server. In this way, virtual replicas, purely virtual objects and applications may interact and collaborate with each other when being configured for accomplishing specific goals even if users are not connected to the server.

According to an embodiment, a plurality of sensing mechanisms mounted on the client devices continuously capture data from the real world that serves to enrich and update explicit data and instructions input through the replica editor. Thus, the persistent virtual world system stored in the server and each of the virtual replicas are kept updated with real-time, multi-source sensory data that mirror the conditions of the real world.

According to an embodiment, client devices include a power source, a memory, sensors, and transceivers, all operatively connected to a processor. In some embodiments, the transceivers are mmW transceivers. The power source is configured to provide power to the client devices; the memory may be adapted to store application program instructions and to store telemetry metadata of the client device from the sensors; the sensors, which may include one or more of an Inertia Measuring Unit (IMU), accelerometers, and gyroscopes, is configured to measure and report the velocity, acceleration, angular momentum, speed of translation, speed of rotation, and other telemetry metadata of the client device; the mmW transceivers may allow the client device to receive mmW from the antennas and to send the data back when interacting with digital reality content, and may also enable positional tracking of the client device; and the processor may be configured to implement application programs stored in the memory of the client device. In certain embodiments the sensors and mmW transceivers may be decoupled (i.e., separate from each other). In other embodiments, the sensors and mmW transceivers may be coupled together, forming one operational component within the client device.

In an embodiment, combining the capabilities of the sensors (e.g., IMU, accelerometers, gyroscopes, and accelerometers) with the positional tracking as provided by the mmW transceivers, may enable sub-centimeter or sub-millimeter positional and orientational tracking, which may increase accuracy when tracking the real-time position and orientation of the client devices and may improve the general user experience. Tracking of the client devices may be performed employing any of several techniques (e.g., time of arrival (TOA), angle of arrival (AOA), visual imaging, radar technology, etc.), and using systems such as global navigation satellite systems (GNSS), assisted GNSS (AGNSS), differential GPS (DGPS), satellite-based augmentation systems (SBASs), real-time kinematic (RTK) systems, or combinations thereof. In some embodiments, tracking of devices is implemented by a combination of AGNSS and inertial sensors in the devices.

According to an embodiment, methods such as server hopping, antenna hopping, and super-peer device implementation may be implemented in a synchronized CC. In an embodiment of server hopping, one or more users may enter a first server zone and engage with digital reality content retrieved from one or more sources, such as one or more digital reality applications. The digital reality content is computed and rendered by a first cloud server in a computing center to be thereafter accessed by a user via a digital reality device. The one or more digital reality devices are continuously tracked by one or more antennas. As a user moves towards a second server zone, the one or more antennas track the movement from the one or more client devices and send the user position to a master server. When users' client devices are found in-between server zones, the master server, based on the location data sent by the antennas from the client devices, instructs the cloud server from the first and second zone to partially compute and render digital reality data. After the one or more user digital reality devices are located in the second server zone, the one or more antennas instruct the master server to start retrieving and synchronizing digital reality data from the digital reality application as sent by the cloud server of the first server zone. Afterwards, the master server starts retrieving digital reality data from the cloud server of the first server zone, synchronizes the digital reality data, and sends the data to the cloud server of the second server zone so that the one or more users seamlessly keep receiving the digital reality content through their client devices when located in the second server zone.

In an embodiment of antenna hopping, continuing with the explanation of server hopping above, as a user approaches a server zone not completely covered by a first antenna but by a second antenna, the antennas may first send the user location data to the master server, and may then alternate, share, or completely switch servicing functions (e.g., communication and tracking) of the client devices depending on the user location, as instructed by the master server.

In an embodiment of super-peer device implementation, using the description of server hopping as an example, as two or more users move farther from a cloud server, the antennas may first send the user location data to the master server, which may then assign the client device closest to the cloud server, and thus, with the highest available QOS, as a super-peer device. The super-peer device may act as a provisional server for the other digital reality devices, aggregating and distributing digital reality data to the other peer devices.

According to an embodiment, dynamic network slicing and QOS management is performed at the digital reality VRAN portion of the cloud server, and may use data from the experience OS that may be required to perform these functions. Dynamic network slicing and QOS management is referred herein as the ability to tailor a set of functions for use of the network for a client device. For example, dynamic network slicing and QOS management may determine the optimum beamforming, steering of antennas, server hopping, antenna hopping, super peer assignment, network functionality needed by client devices, and optimum number of subcarriers and total bandwidth per client devices required to optimize QOS.

The dynamic network slicing and QOS management may be based on parameters including point of service, context, priority, and security, for which relevant data are stored and updated at the different cloud servers and master servers, and which are managed at the experience OS portion of the servers. Accordingly, these parameters are available through the virtual replicas of the real world comprised within the persistent virtual world system stored in the cloud servers, including data and instructions that simulate the real appearance and behavior of each of the real elements.

Point of service refers herein to the location of a client device as related to the distance between a client device and an antenna. For example, the farther a client device goes from the antenna, because of signal attenuation, the more subcarriers that the client device may need to be assigned in order to compensate for this attenuation.

The direct or indirect environment of a client device and an antenna may be classified as "micro-context" and "macro-context". Context information may be input through the replica editor in the cloud server, may be captured through sensing mechanisms of the client devices, or may be inferred by the cloud servers, or combinations thereof. The term "micro-context" refers to the context immediately surrounding a client device and an antenna, such as any people, objects, or conditions that may directly affect sending and receiving of network signals. Micro-context may include data such as 3D image data, 3D geometries, 3D entities, 3D sensory data, 3D dynamic objects, video data, audio data, textual data, time data, material data, dimensional data, metadata, positional data, lighting data, temperature data, and service context data, amongst others, of the environment immediately surrounding and affecting a target real world entity.

For example, if a client device is receiving network signals inside of a building, relevant micro-context having an effect over the network slicing and QOS management may include building materials, wall thicknesses, and window locations, as well as buildings or other structures around the antennas or around the client device that may potentially attenuate the network signals, all or most of which may be relevant during processing by the digital reality VRAN. Further in this example, the digital reality VRAN may determine how to direct network signals such that the QOS may be optimized and may reach client devices with the least possible attenuation, including performing an optimum beamforming and steering of antennas in order to avoid buildings and other structures around the antenna, and directing the signals through windows or thinner walls where a client device may be located, instead of doing so through thicker walls or walls made of materials where network signals may have difficulties penetrating.

The term "macro-context" refers to the indirect context surrounding an antenna and client device. The macro context may be derived by the cloud server from a plurality of micro-contexts, giving rise to more holistic information of a system, such as the current efficiency of a manufacturing plant, air quality, climate change levels, company efficiency, city efficiency, country efficiency, etc. The macro context may be considered and computed at different levels based on goals, including local level (e.g., office or manufacturing plant), neighborhood level, city level, country level, or even planet level. Thus, depending on these goals, the same real world entity data and micro context data may derive different types of macro-contexts.

The term "service context" refers to the actual applications being used by a user or users in the vicinity. As each application consumes bandwidth, service context may provide the cloud server with valuable context information required to assess provisioning of network signals to each client device.

According to an embodiment, the dynamic network slicing and QOS management is performed using machine learning algorithms. Generally, during machine learning, a programmer provides a computer with a set of sample data and a desired outcome, and the computer generates its own algorithm on the basis of those data that it can apply to any future data. Thus, in the current disclosure, a set of dynamic network slicing and QOS management parameters along with data sets corresponding to each parameter and desired outcomes may be provided for training the machine learning algorithms. These algorithms may go through numerous iterations during training in order to generate trained machine learning models that may be used when performing dynamic network slicing and QOS management. The training and inference may be performed by at least one processor in the cloud server.

"Priority" or "priority data" refers to the relative importance that certain users may have with respect to the service providers, which may be determined by the type of contract agreed by the different parties. The type of priority may influence the context rankings and thus the amount of bandwidth that users may receive for each type of service.

Parameters related to security may translate into various security measures such as data encryption, firewalls, Virtual Private Networks (VPNs), etc. The level of security may be determined by the type of contract.

In some embodiments, rendering and computing tasks may be shared between the different cloud servers, client devices, and/or the super-peer device.

In some embodiments, server zones may include one or more geographically limited zones. For example, a server zone may be an outdoor location (e.g., a park, a sports field, a street, a zoo, etc.) or an indoors location (e.g., a game zone, restaurant, entertainment club, theater, office, etc.).

According to an embodiment, a method for providing real-time responsive and continuous location-based services in three-dimensional space to client devices comprises synchronizing, by one or more mutually connected data centers, a plurality of distributed computing centers, which form a wide area distributed computing center network configured to provide real-time responsive and continuous location-based services in three-dimensional space; and performing, by the master servers, a dynamic network slicing and quality of service management through management of the distributed computing centers.

According to an embodiment, the method for dynamic network slicing and quality of service management comprises assigning each user with a profile selected from one or more of a global profile, a contract-based profile, or a machine-learning-based profile; determining service context parameters and ranking values, priority levels, and security levels of the users depending on the user profiles; allocating bandwidth to each user according to the user profile; and performing dynamic network slicing and QOS management based on context and point of service, but staying within the user ranking values determined by the assigned user profile.

According to an embodiment, the method for dynamic network slicing and quality of service management by the digital reality VRAN further comprises determining the optimum beamforming, steering of antennas, server hopping, antenna hopping, super peer assignment, network functionality needed by client devices, and optimum number of subcarriers and total bandwidth per client devices required to optimize quality of service.

According to an embodiment, server hopping performed by the master server comprises receiving client device location data from antennas; and when users' client devices are located in zones not entirely covered by a cloud server, instructing a cloud server nearest to users to compute and render digital reality data for the client device.

According to an embodiment, antenna hopping performed by the master server comprises receiving client device location data from antennas; and when users' client devices are located in zones not completely covered by an antenna, instructing one or more antennas nearest to users to perform tracking and data provisioning for the client devices.

According to an embodiment, super peer assignment by the master server comprises receiving client device location data from antennas; when users' client devices are located in zones where quality of service and system computing power is not optimized, assigning one or more client devices as super-peer devices for aggregating and distributing digital reality data for peer client devices; and dynamically adjusting the level of computational and rendering operations across the cloud servers, super peer devices, and other peer client devices.

According to an embodiment, the method for dynamic network slicing and quality of service management by the digital reality VRAN is performed based on data from the persistent virtual world system stored in cloud servers and master servers.

The global profile may be a generic profile assigned to average users. Thus, context ranking values (e.g., values assigned to each type of bandwidth-consuming service such as calling, streaming videos, sending and receiving short message services (SMS), downloading/uploading files, and downloading/uploading videos, etc.) are assigned based on a statistical mean of usage from average users. Global profiles may, in some embodiments, be applied geographically (city, state, country, region, etc.) if it is determined that significant geographical differences exist between context ranking values.

A contract-based profile may include adjusted context ranking values for each context parameter according to the terms stipulated in a contract between the user and the service provider. Contract-based profiles may also determine other factors such as priority and security.

Machine-learning-based profiles may determine service context rankings through usage of machine-learning techniques and may optimize network traffic based on a context zone determined by an event. For example, if there is a sports game taking place in a stadium, and users are recording the video and doing live video-streaming, the machine-learning techniques may determine a high context ranking value for that particular group of users and may provide users accordingly with necessary bandwidth. In other embodiments, the machine-learning-based profile may also be used to determine individual users profile and compute a ranking value accordingly.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary. Other features and advantages will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where:

FIG. 11 depicts service context parameters, according to an embodiment;

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1:
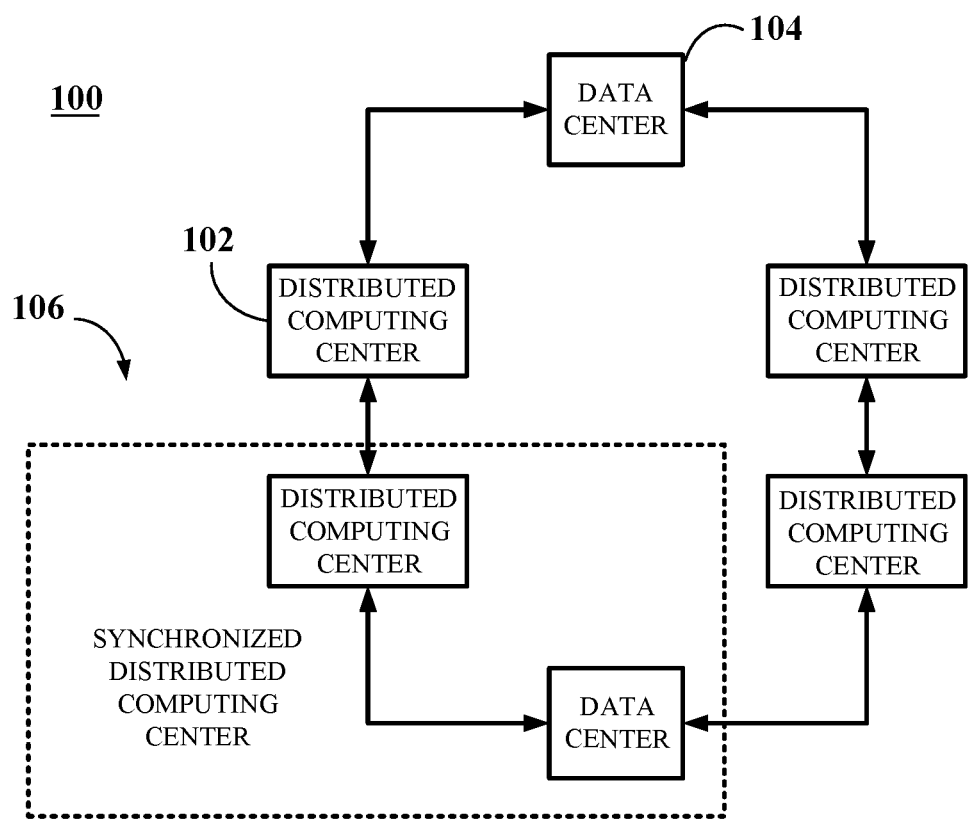
FIG. 1 depicts a schematic representation of a system of the current disclosure detailing a distributed computing center network for enabling real-time responsive and continuous location-based services in three-dimensional space, according to an embodiment.

FIG. 1 depicts a schematic representation of a wide area distributed computing center network (WADCCN) system 100 for enabling real-time responsive location-based cloud computing, rendering, tracking, and communication services in three-dimensional space, according to an embodiment. Three-dimensional space may refer to space in the physical world, a virtual world, which may include virtual, mixed or augmented reality (VR, MR and AR), or both the physical world and a virtual world.

WADCCN system 100 may include various distributed computing centers 102 (DCCs), one or more of which are connected to data centers 104 (DCs) and are synchronized by the DCs 104. In an embodiment, two or more communicatively connected and synchronized DCCs 102 may form the WADCCN system 100, which may be configured to cover and service large geographical areas. In further embodiments, at least one DCC 102 communicatively connected to at least one DC 104 may form a synchronized distributed computing center (DDC) 106, which may be configured to cover and service smaller geographical areas.

Figure 2:
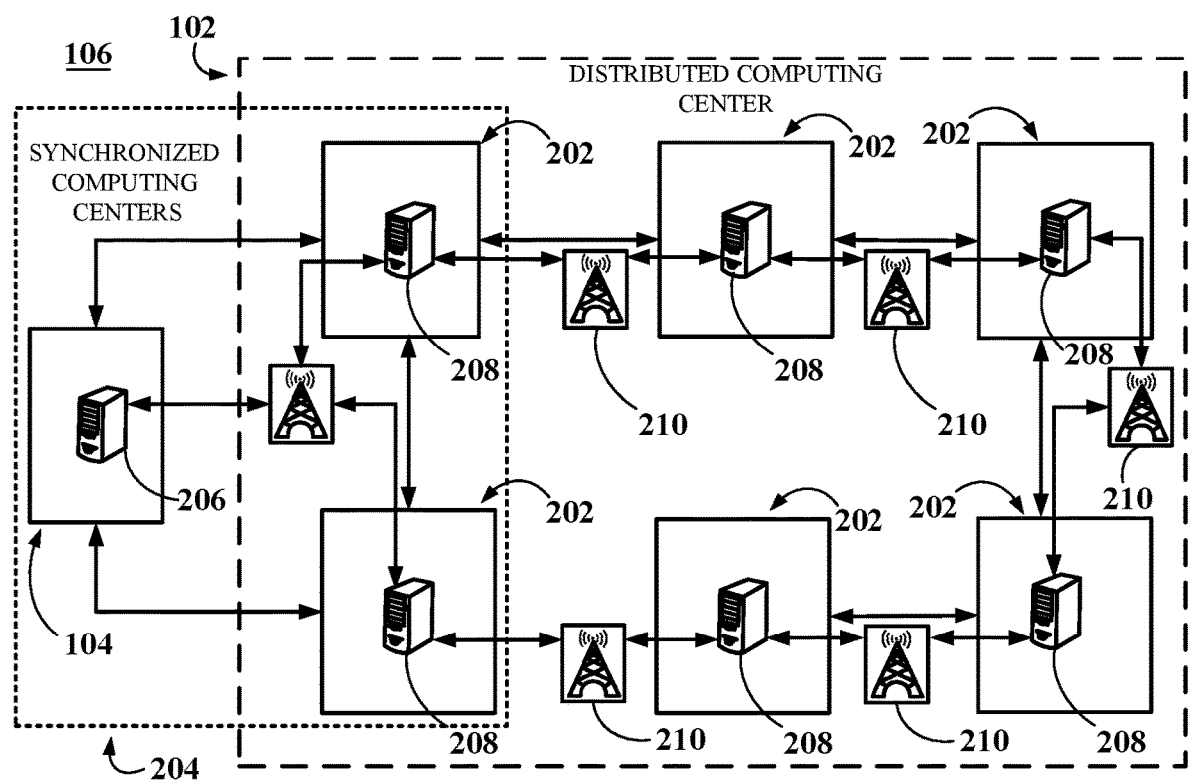
FIG. 2 depicts a schematic representation of a system of the current disclosure detailing a synchronized distributed computing center, according to an embodiment.

FIG. 2 depicts an architectural diagram of a synchronized DDC 106 that may be included in the WADCCN system 100 described in FIG. 1, according to an embodiment. The system of FIG. 2 may include similar elements as those of the system of FIG. 1, and may therefore contain the same or similar reference numbers.

In FIG. 2, a plurality of computing centers 202 (CCs) are communicatively connected to each other, forming a DCC 102. The connection between CCs may be a wired or wireless connection. In some embodiments, two or more CCs 202 communicatively connected to one or more DCs 104 may form a synchronized CC 204. Generally, synchronized CCs 204 may be configured to service geographically specific server zones, as will be further explained in FIG. 4.

DCs 104 may include facilities to house computer systems and associated components, such as telecommunication and storage systems, power supplies, redundant data communication connections, environmental controls, and various security devices. DCs 104 may be located in remote areas and may cover relatively large geographical extensions in order to provide service to a plurality of DCCs 102. For example, a DC 104 may cover enough area to be able to service and synchronize city, country, or in some cases continental setups of WADCCN system 100.

In some embodiments, DCs 104 may include one or more master servers 206 with computing resources sufficient to perform application and user data storage and synchronization of data received from different cloud servers 208. Data synchronization may include the process of maintaining the consistency and uniformity of digital reality and user data across the different cloud servers 208 from various server zones.

In further embodiments, CCs 202, which house the cloud servers 208, may be smaller versions of DCs 104, and thus may also include facilities to house computer systems and associated components. However, CCs 202 may differ from DCs 104 in that CCs 202 may be located in populated areas to be closer to users and thus provide better service to users (e.g., with reduced latency and an increased quality of service (QOS)).

In some embodiments, between about two and about fifty CCs 202 may mutually connect to form a DCC 102. Network connection antennas 210 may be configured within, in areas relatively close to CCs 202, DCs 104, and/or areas serviced by the CCs 202 in order to provide them with communication services and tracking services.

In an embodiment, for servicing devices located outdoors, antennas 210 may include millimeter wave (mmW)-based antenna systems or a combination of mmW-based antennas and sub 6 GHz antenna systems, such as through 5th generation wireless systems communication (5G). In other embodiments, antennas 210 may include other types of antennas, such as 4G antennas, or may be used as support antennas for the mmW/sub GHz antenna systems.

In embodiments whereby antennas 210 are servicing indoors, the antennas 210 may use wireless local area networking (WiFi), providing data at, for example, 16 GHz.

For outdoor antenna systems in the current disclosure, the mmW band, also called the extremely high frequency band, is employed. The millimeter-wave band spans from 30 to 300 GHz; however, neighboring super-high frequencies from about 10 to 300 GHz may also be included, since these waves propagate similarly to mmW. Mmw-based antennas or combinations of mmW-based antennas and sub GHz antenna systems, because of the extremely high frequency of mmW, are highly reflective, being easily blocked by walls or other solid objects, and may suffer significant attenuation passing through foliage or in tough weather conditions. Therefore, the antennas 210 may include small, mmW transceivers arranged in a grid pattern, which can help to magnify the collective energy, increase gain, and decrease power losses without increasing transmission power. Techniques such as multiple-input, multiple-output, or MIMO, may be used to separate beams at several devices simultaneously or send multiple data streams to a single device, thereby increasing QOS. Additionally, the antennas may cover relatively small areas between about 100 meters to about 2 km to ensure accurate propagation of the millimeter waves. The antennas 210, leveraging both sub 6 GHz and mmW frequency space, may provide ubiquitous or very broad coverage and network capacity to elements of synchronized CC 204.

Figure 3A:
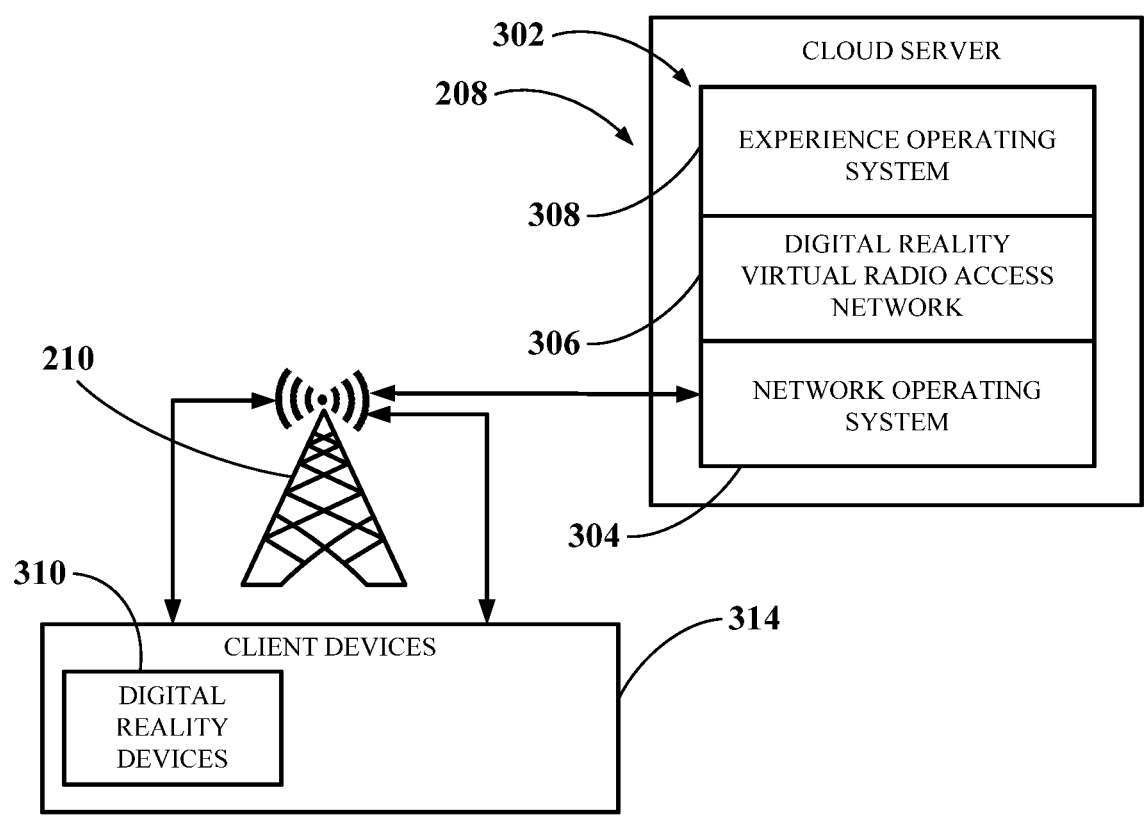
FIGS. 3A-B depicts a schematic representation of a system of the current disclosure detailing cloud servers, according to an embodiment.
Figure 3B:
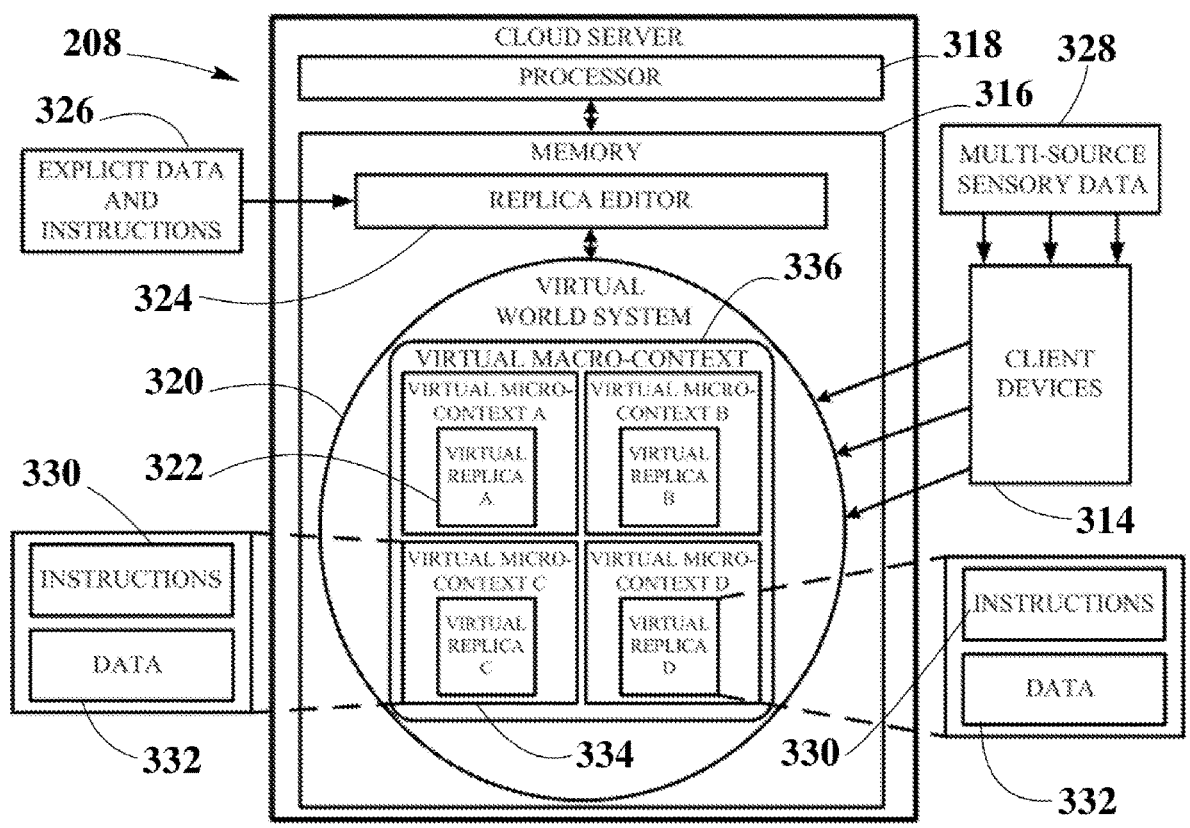

FIGS. 3A-3B depict illustrative diagrams of a cloud server 208 according to embodiments of the current disclosure. The system of FIGS. 3A-B may include similar elements as those of the systems of FIGS. 1-2, and may therefore contain the same or similar reference numbers.

FIG. 3A depicts operating systems 302 embedded within the cloud servers 208, according to an embodiment. The operating systems 302 stored in the cloud servers 208 include a set of software comprising data and instructions that, when executed by a processor of the cloud servers 208, enable a real-time responsive and continuous location-based cloud computing, rendering, tracking, and communication services of client devices in three-dimensional space with synchronized DCCs. The operating systems 302 may include a network operating system 304 (NOS), a digital reality virtual radio access network (VRAN) 306, and an experience operating system (OS) 308. Operating systems 302 within the cloud servers 208 may be communicatively connected to the one or more antennas 210 through the NOS 304.

The NOS 304 includes a set of data and instructions that provide functions for connecting the antennas 210 to the cloud servers 208. The NOS 304 additionally includes functions for connecting the antennas 210 to client devices 314 such as digital reality devices 310 or other connected computing devices. Digital reality devices 310 may include head-mounted display devices, see-through devices, and smart contact lenses, for example. Aside from digital reality devices, client devices may include any type of suitable computing devices that may connect to the cloud server 302 and to each other, such as Internet of Things devices.

Non-limiting examples of connected computing devices include vehicles (e.g., cars, trains, planes, drones, amusement rides, etc.), mobile devices (e.g., cell phones, notebook computers, tablet computers, etc.), wearable devices (e.g., shoes, gloves, hats, rings, clothes, etc.), projectiles with embedded computing and communication hardware (e.g., sports balls, frisbees, boomerangs, other toys), and other physical objects with embedded computing and communication hardware such as train tracks, streets, street lights, buildings, and the like.

In an embodiment, the NOS 304 employed in the cloud server 208 may be an Open Network Automation Platform (ONAP), which is an open source software platform that delivers capabilities for the design, creation, orchestration, monitoring, and life cycle management of virtual network functions (VNFs), carrier-scale Software Defined Networks (SDNs) included in the VNFs, and higher-level services that combine the above functions. ONAP provides for automatic, policy-driven interaction of these functions and services in a dynamic, real-time cloud environment, achieving both faster development and greater operational automation.

Typically, baseband processors that manage radio functions are located at the radio sites (e.g., at radio or network antennas). Implementing the digital reality VRAN 306 of the current disclosure involves moving the baseband processors, originally located at the radio sites, to CCs and DCs, and are implemented using virtual machines (VMs) on the cloud servers 208 and master servers, decentralizing the functions at the radio sites and virtualizing network functions in the radio access network (RAN). VMs are software-based emulations of a computer system, which are based on computer architectures and provide functionality of a physical computer.

When antennas 210 provide mmW radio signals that enable data connection between the different elements of the system and digital reality devices 310, the network signals may not propagate efficiently at longer distances and may be excessively absorbed by the atmosphere, rain, and vegetation at these distances, due to the extremely high frequencies of the millimeter waves. Thus, by employing several CCs in densely populated areas, the digital reality VRAN 306 is allowed to perform an efficient scaling and pooling of network resources in the proximity of users, bringing network signals closer to users and avoiding mentioned drawbacks of mmW spectrum signals.

The experience OS 308 includes data and instructions used by the digital reality VRAN 306 to determine the processing required to control and provide network signals to client devices for QOS management. In some embodiments, the experience OS 308 receives, stores, processes, and provides data and instructions to the digital reality VRAN 306 related to the number, position, and orientation, and metadata of client devices that are to be serviced by an antenna 210 as well as the context that affects each client device 314 and each antenna 210 and which may have an effect on the QOS management.

FIG. 3B depicts a cloud server 208 of the current disclosure connected to client devices 314 via a network. The cloud server 208 includes memory 316 and at least one processor 318. The memory 316 stores a persistent virtual world system 320 in a database or data structure and includes a plurality of virtual replicas 322, such as virtual replicas A, B, C, and D, corresponding to respective real world elements. The virtual replicas 322 are communicatively connected to the real world entities via sensors connected to the client devices 314. The memory 316 may further stores purely virtual objects not available in the real world, as well as applications which may also be represented by virtual objects.

According to an embodiment, the memory 316 may further include a replica editor 324 which may include software and hardware configured to enable users to model and edit the virtual replicas 322 of the real world entities, the purely virtual objects, and the applications. The replica editor 324 may be, for example, a computer-aided drawing (CAD) software that may store data and instructions necessary to input and edit virtual replicas 322, the purely virtual objects, and the applications. The replica editor 324 may enable the input of explicit data and instructions 326 that relate to each virtual replica 322, the purely virtual objects, and the applications, which refer to data and instructions that describe their shape, location, position and orientation, physical properties, and expected functioning. In an embodiment, explicit data and instructions 326 may not be obtained by the sensors of client devices 314 but may instead need to be input digitally through the replica editor 324, such as priority data, building materials, wall thicknesses, electric installations and circuitry, water pipes, fire extinguishers, emergency exits, window locations, machine performance parameters, machine sensor and valve locations, etc. "Instructions" refers to code (e.g., binary code) that can be executed by the processor 318. In the context of the persistent virtual world system, instructions represent, on the virtual replica 322, the behavior of the real world entity.

In some embodiments, a virtual replica 322 includes one or more of 3D world and building data, such as SLAM or derivate-mapping based data; 3D geometry data; 3D point cloud data; or geographic information system data representing real-world structural properties that may serve to model a 3D structure for the virtual replicas 322.

As way of example, a virtual replica 322 of an elevator may include data and instructions representing the geometry, materials, and physics, along with the mechanics and functioning of the elevator. The functioning, such as the movement from one floor to another, may be updated in real time in the persistent virtual world system 320 as the elevator moves in real life. Likewise, if the elevator includes sufficient computing and communication hardware and connected electromechanical components that allow the elevator to be controlled responsive to communications from the persistent virtual world system 320, the elevator may be indirectly manipulated in real life by manipulating the virtual replica 322.

Modeling techniques for converting real world entities into virtual replicas 322 with explicit data and instructions 326 and making them available in the persistent virtual world system 320 may be based on readily-available CAD models of the real world entities. For example, machine owners may provide an administrator of the persistent virtual world system 320 or may input by themselves the already-existing digital CAD models of their machines. Similarly, building owners may provide building information models (BIM) with building details to be stored in the persistent virtual world system 320, which may include information that may not be visible or easily obtainable via sensing mechanism. In these embodiments, the owners of these real world entities may be responsible for adding the virtual replicas 322 into the persistent virtual world system 320, which may be achieved, for example, through incentive systems or by legal requirements. In some embodiments, the administrators of the persistent virtual world system 320, and even government officials, may collaborate with owners of real world entities for inputting the real world entities into the persistent virtual world system 320 and therefore realizing a faster and more thorough creation of the persistent virtual world system 320.

In other embodiments, radar-imaging, such as synthetic-aperture radars, real-aperture radars, Light Detection and Ranging (LIDAR), inverse aperture radars, monopulse radars, and other types of imaging techniques may be used to map and model real world entities before integrating them into the persistent virtual world system 320. Utilizing these technical solutions may be performed especially in cases where the original models of the structures are not available, or in cases where there is missing information or there is a need to add additional information to the virtual world entities which is not provided by the CAD models.

The explicit data and instructions 326 input through the replica editor 324 may include, apart from the shape and other properties of a real world entity, descriptive data and instructions that detail the expected functioning of the real world entity. For example, the explicit data and instructions 326 of a building may include the shape and properties of the building (e.g., 3D shapes, thickness of walls, location of fire alarms, materials used for each segment, location of windows, location of electric lines and water pipes, etc.), along with descriptive data and instructions that detail how much bandwidth a building is designed to consume, the number of people that the building may allow, how many people should circulate daily, etc.

Independent of the modeling techniques used for creating the virtual replicas 322, the information of each virtual replica 322 should provide enough details about each corresponding real world entity so that a highly accurate virtual replica 322 of each real world entity is available. The virtual replicas 322 are then enriched and updated through multi-source sensory data 328. Thus, each virtual replica 322 includes data 330 and instructions 332 that serve to describe the real appearance and behavior of each real world entity.

The multi-source sensory data 328 may also include contextual data, such as micro-context including micro-context A, B, C, and D (not shown) from real-world elements, and macro-context (not shown). This data is then transferred to the persistent virtual world system 320 to become, respectively, a virtual micro-context 334 including corresponding digital micro-contexts A, B, C, and D, and a virtual macro-context 336, which are updated in real-time based on the multi-source sensory data 328 obtained by sensors of the client devices 314. The virtual micro-context 334 and virtual macro-context 336 also include data 330 and instructions 332 that serve to describe the respective real-world appearance and behavior of elements within the micro-context 334 and macro-context 336.

Including a persistent virtual world system 320 along with sensory and explicit data and instructions that mimic the appearance and behavior of the real world along with the context corresponding to each entity and to the system as a whole may assist in the adjustment of QOS for each client device 314, as the management of QOS and provision of services such as real-time tracking, communication, rendering, and computing may be directly linked to this data and instructions embedded in each virtual replica 322. Thus, in some embodiments, the network slicing and quality of service management is based on data from the persistent virtual world system 320.

Figure 4A:
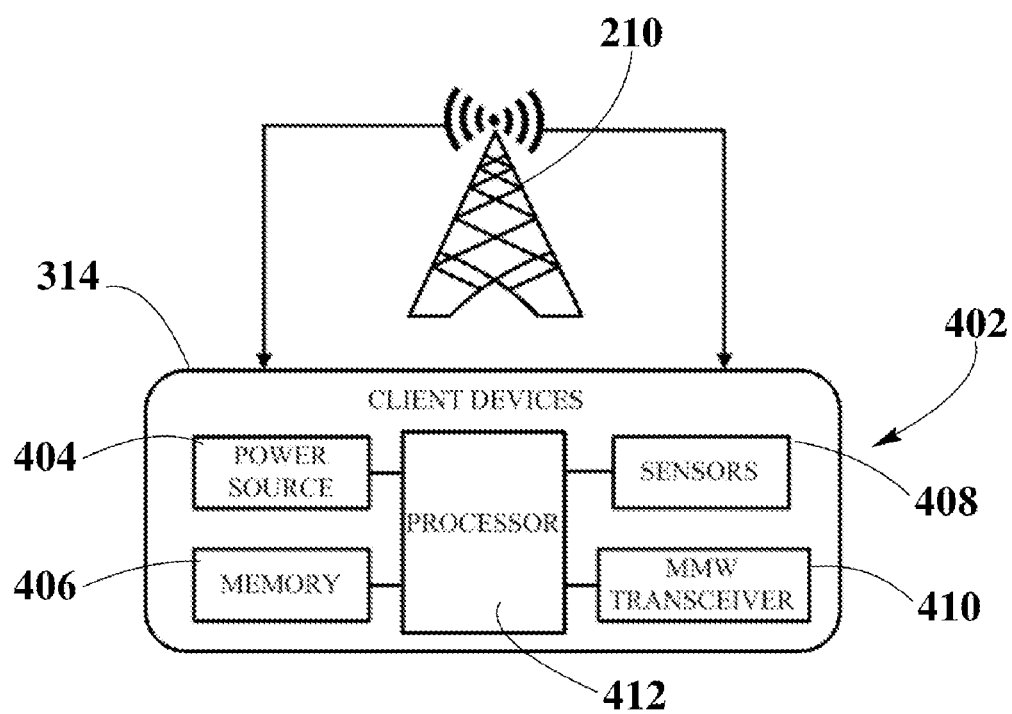
FIGS. 4A-B depict schematic representations of a system of the current disclosure detailing operational components of client devices that may be serviced by antennas, according to an embodiment.
Figure 4B:
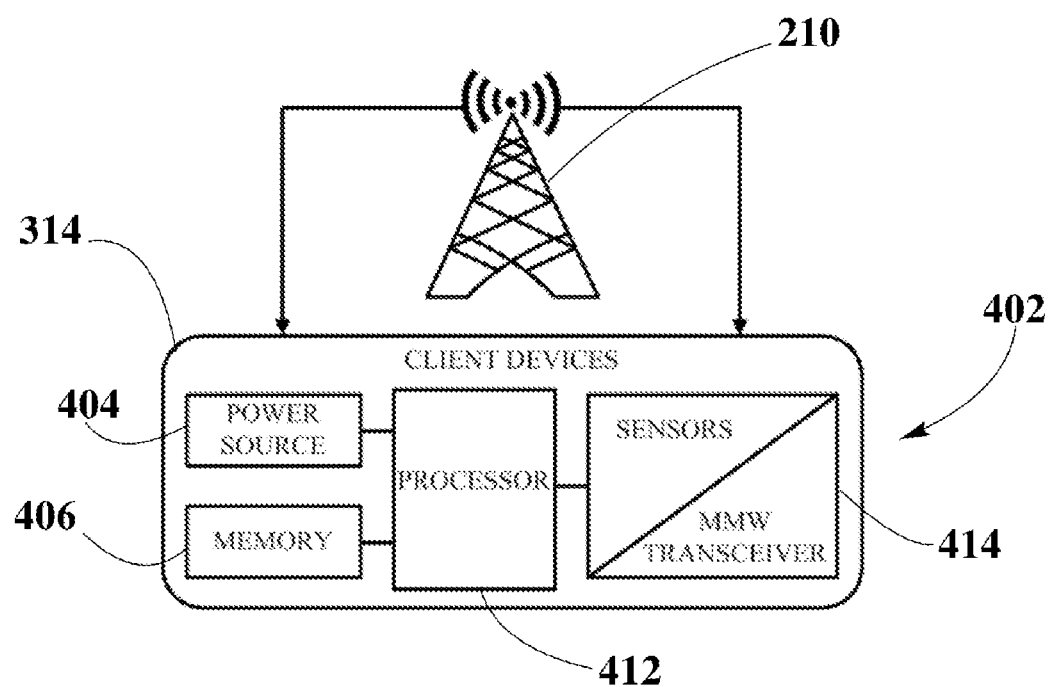

FIGS. 4A-B depict diagrams 400 including operational components 402 of the client devices 314 (e.g., digital reality devices 310 or other connected computing devices) that may be serviced by the antennas 210, according to an embodiment. The systems of FIGS. 4A-B may include similar elements as those of the systems of FIGS. 1-3B, and may therefore contain the same or similar reference numbers.

FIG. 4A shows an embodiment where the operational components 402 of the client devices 314 include a power source 404, a memory 406, sensors 408 and a mmW transceiver 410, all operatively connected to a processor 412.

The power source 404 is configured to provide power to the client devices. In one embodiment, the power source 404 may be a battery. The power source 404 may be built into the client devices or removable from the client devices, and may be rechargeable or non-rechargeable. In one embodiment, the client devices may be repowered by replacing one power source 404 with another power source 404. In another embodiment, the power source 404 may be recharged by a cable attached to a charging source, such as a universal serial bus ("USB") FireWire, Ethernet, Thunderbolt, or headphone cable, attached to a personal computer. In yet another embodiment, the power source 404 may be recharged by inductive charging, wherein an electromagnetic field is used to transfer energy from an inductive charger to the power source 404 when the two are brought in close proximity, but need not be plugged into one another via a cable. In another embodiment, a docking station may be used to facilitate charging.

The memory 406 may be implemented as computing hardware and software adapted to store application program instructions and to store multi-source sensory data captured by the sensors 408. The memory 406 may be of any suitable type capable of storing information accessible by the processor 4121, including a computer-readable medium, or other medium that stores data that may be read with the aid of an electronic device, such as a hard-drive, memory card, flash drive, ROM, RAM, DVD or other optical disks, as well as other write-capable and read-only memories. The memory 406 may include temporary storage in addition to persistent storage.

The sensors 408 may include one or more of an Inertia Measuring Unit (IMU), accelerometers, and gyroscopes, amongst others. The IMU is configured to measure and report the velocity, acceleration, angular momentum, speed of translation, speed of rotation, and other telemetry metadata of the client device by using a combination of accelerometers and gyroscopes. In one embodiment, accelerometers within the IMU may include a tri-axial accelerometer that is capable of measuring acceleration in three orthogonal directions. In other embodiments one, two, three, or more separate accelerometers may be included within the IMU. In other embodiments, additional accelerometers and gyroscopes may be included separate from the IMU.

The mmW transceivers 410 may allow the client device to receive mmW from the antennas and to send the data back to antennas when interacting with digital reality content. The mmW transceivers 410 may also enable positional tracking of the client device. The mmW transceiver 410 may be a two-way communication mmW transceiver 410.

In an embodiment, combining the capabilities of the sensors 408 (e.g., IMU, accelerometers, and gyroscopes) with the positional tracking provided by the mmW transceivers 410 may enable sub-centimeter or sub-millimeter positional and orientational tracking, which may increase accuracy when tracking the real-time position and orientation of the client devices and may improve the general user experience.

Tracking of the client devices may be performed employing different techniques. For example, tracking may be performed by employing time of arrival (TOA) tracking technique, which uses information gathered from three or more antennas. The client device then sends out a signal that is received by all of the antennas within range. Then, each antenna measures the amount of time it has taken to receive the signal from the time the signal was sent, triangulating the position of the client device. In other embodiments, tracking of client devices may be performed by using an angle of arrival (AOA) technique which, instead of using the time it takes for a signal to reach three base stations like TOA does, uses the angle at which a client device signal arrives at the antennas. By comparing the angle-of-arrival data among multiple antennas (at least three), the relative location of a client device can be triangulated. In further embodiments, other tracking techniques may be employed (e.g., visual imaging, radar technology, etc.).

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In an embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 16 GHz. In alternative embodiments, the GNSS is augmented via other techniques, such as via differential GPS (DGPS), satellite-based augmentation systems (SBASs), real-time kinematic (RTK) systems. In some embodiments, tracking of devices is implemented by a combination of AGNSS and inertial sensors in the devices.

The processor 412 may be implemented as computing hardware and software configured to receive and process instructions. For example, the processor 718 may be configured to provide imaging requests, receive imaging data, process imaging data into environment or other data, process user input data and/or imaging data to generate user interaction data, perform edge-based (on-device) machine learning training and inference, provide server requests, receive server responses, and/or provide user interaction data, environment data, and content object data to one or more other system components. For example, the processor 412 may receive user input data from an I/O module (not shown) and may respectively implement application programs stored in the memory 406. In other examples, the processor 412 may receive multi-source sensory data from sensors 408 captured from the real world, or may receive an accurate position and orientation of the client device 314, and may prepare some of the data before sending the data to a server for further processing.

FIG. 4B shows an embodiment where the client devices 314 include a power source 404, a memory 406, and a coupled sensor/mmW transceiver 414, all operatively connected to a processor 412. The functionality of the operational components 402 may be the same as described in FIG. 4A.

In some embodiments, a tracking module (not shown) may be implemented by combining the capabilities of the IMU, accelerometers, and gyroscopes with the positional tracking provided by the mmW transceivers 410 and the accurate tracking, low-latency and high QOS functionalities provided by mmW-based antennas may enable sub-centimeter or sub-millimeter positional and orientational tracking, which may increase accuracy when tracking the real-time position and orientation of a client device 314.

In other embodiments, one or more operational components 402 may be omitted, or one or more additional components may be added.

FIGS. 5A-E depict architectural diagrams of a synchronized CC 204 which may be configured for enabling real-time responsive and continuous location-based services in three-dimensional space through server hopping and antenna hopping, according to an embodiment. The systems of FIGS. 5A-E may include similar elements as those of the systems of FIGS. 1-4B, and may therefore contain the same or similar reference numbers. In a synchronized CC 204, a user 502 may receive and interact with digital reality content 504 retrieved from one or more sources, such as one or more digital reality applications 506. The digital reality data that generates the digital reality content 504 is computed and rendered by a cloud server and viewed by a user 502 through, for example, a digital reality device 310. The digital reality device 310 is continuously tracked by one or more antennas.

In some embodiments, the digital content provided by the one or more digital reality applications 506 may include at least one of the following: image data, 3D geometries, video data, audio data, textual data, haptic data, or a combination thereof. In these embodiments, one or more parts of the digital content to be provided to the at least one user 502 may include augmented reality (AR), virtual reality (VR), or mixed reality (MR) digital content. If a user 502 views the digital content as AR digital content, the AR digital content includes physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of the user 502 or virtual objects overlay in the real world to become interactive and digitally manipulable. If a user 502 views the digital content as VR digital content, the VR digital content may include virtual elements that are used to replace the real world with a simulated one. If a user 502 views the digital content as MR digital content, the MR digital content may include a mixture of augmented physical, real-world environment elements interacting with virtual elements. For example, an MR experience may include a situation where cameras capture real humans. Subsequently, suitable computer software creates a 3D mesh of the humans that is then inserted into a virtual world and is able to interact with the real world.

According to an embodiment, the cloud server may be a remote server with computing resources sufficient to carry out heavy load applications, such as rendering digital content from one or more digital reality applications 506. The cloud server may be configured to provide a combined single data stream to at least one digital reality device 310. In some embodiments, the cloud server communicatively connects to the digital reality device 310 and to the digital reality applications 506 through a wireless systems communication, including but not limited to mmW-based wireless systems communication and/or wireless local area networking (Wi-Fi). Mmw-based connection may allow for low latency (e.g., 1 to about 5 millisecond end-to-end (E2E) latency) and about high downlink speeds (e.g., 1 to about 10

Gbps downlink speeds) to end points in the field, complying with parameters necessary for executing the typically highly-interactive digital reality applications. This may result in high-quality, low latency, real-time digital content streaming.

Cloud computing networks, which include the cloud servers, implement a computing environment that is run on an abstracted, virtualized infrastructure that share resources such as CPU, memory, and storage between applications. Typically, a cloud computing environment implements a distributed computing architecture of distributed data storage and other content via software and services provided over a network or the Internet. Using a cloud computing network, access to computing power, computer infrastructure, applications, and business processes can be delivered as a service to a user on demand. Cloud servers, as described with reference to FIG. 2, may be located in facilities such as CCs.

In some embodiments, the synchronized CC 204 may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

Figure 5A:
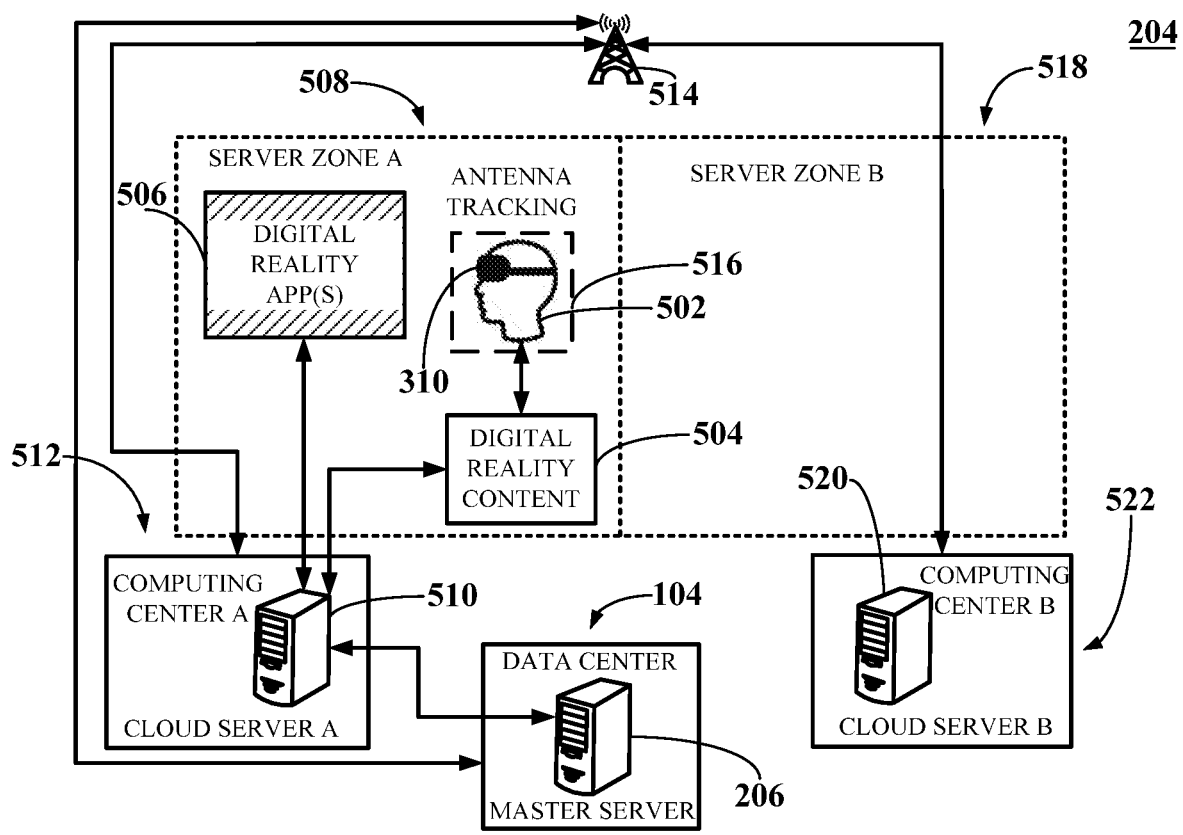
FIGS. 5A-F depict schematic representations of a system of the current disclosure detailing a synchronized computing center which may be configured for enabling real-time responsive and continuous location-based services in three-dimensional space, according to an embodiment.

In FIG. 5A, a user 502 is located in a server zone such as server zone A 508. In the server zone A 508, the user 502 is able to receive, view, and engage, via the digital reality device 310, with digital reality content 504 retrieved by cloud server A 510, located in CC A 512, from one or more digital reality applications 506. Any transfer of data to and from the digital reality device 310 is performed through the antennas, such as one or more antennas A 514, in areas covered by the antennas A 514 and as determined by the position of the digital reality devices 310.

The one or more antennas A 514, which in this example are continuously tracking 516 user digital reality devices 310, may send positional and orientational data of the digital reality devices 310 to a master server 206 located in a DC 104. Generally, the master server 206 may send instructions to a respective cloud server to compute and render digital reality content 504 depending on which server zone the user 502 is located in. For example, as viewed in FIG. 5A, the user 502 is still located in server zone A 508, therefore the master server 206 instructs cloud server A 510 to compute and render the digital reality content 504 for the user 502.

In some embodiments, server zones may include one or more geographically limited zones that may be serviced by one or more cloud servers and by one or more antennas. For example, a server zone may be an outdoor location (e.g., a park, a sports field, a street, a zoo, etc.) or an indoors location (e.g., a game zone, restaurant, entertainment club, theater, office, etc.) serviced by antenna A 514 and by cloud server A 510.

Figure 5B:
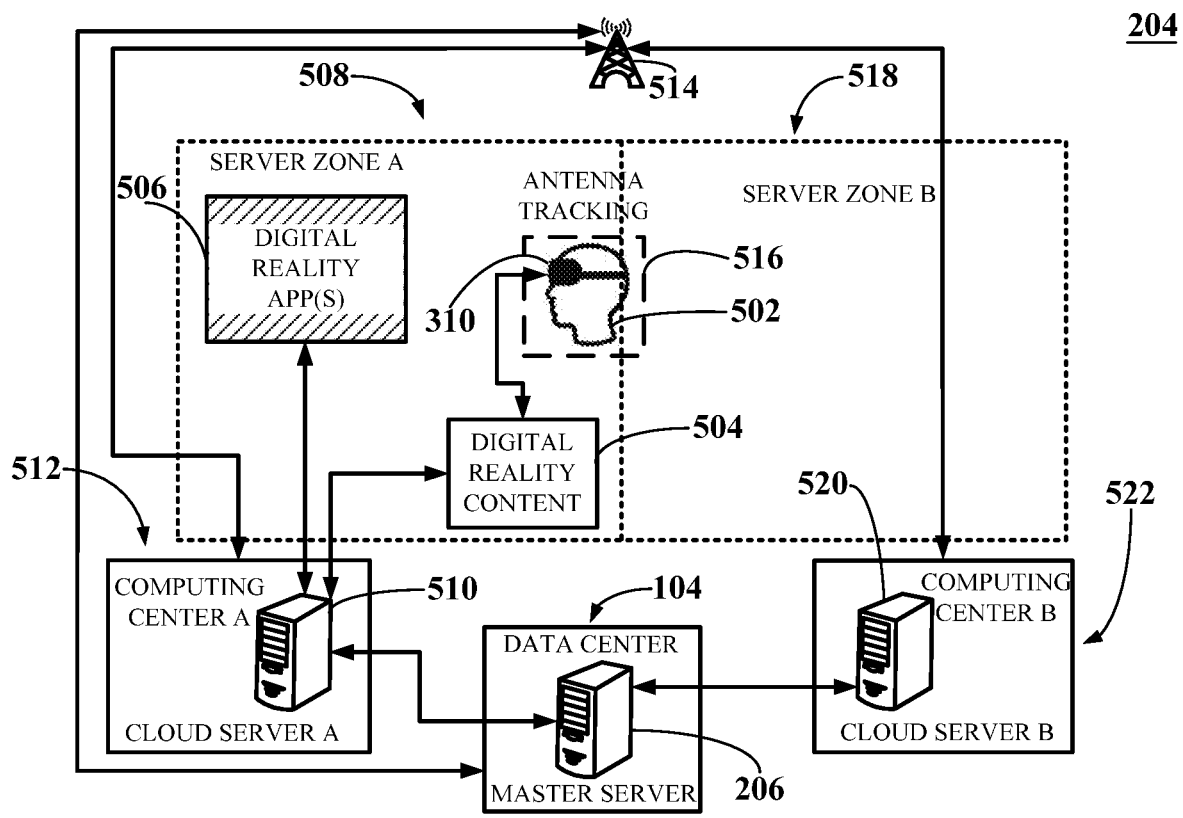

In FIG. 5B, as the user 502 moves closer to server zone B 518, the one or more antennas A 514 instruct the master server 206 to prepare to start retrieving and synchronizing digital reality data from the digital reality application 506, and to thereafter send the synchronized digital reality data to cloud server B 520 located in CC B 522 as soon as the user 502 moves into server zone B 518. It is important to note in this embodiment that, as long as the user 502 is still located in server zone A 508 in areas where QOS is suitable, then the user 502 may still receive digital reality content 504 from cloud server A 510.

Figure 5C:
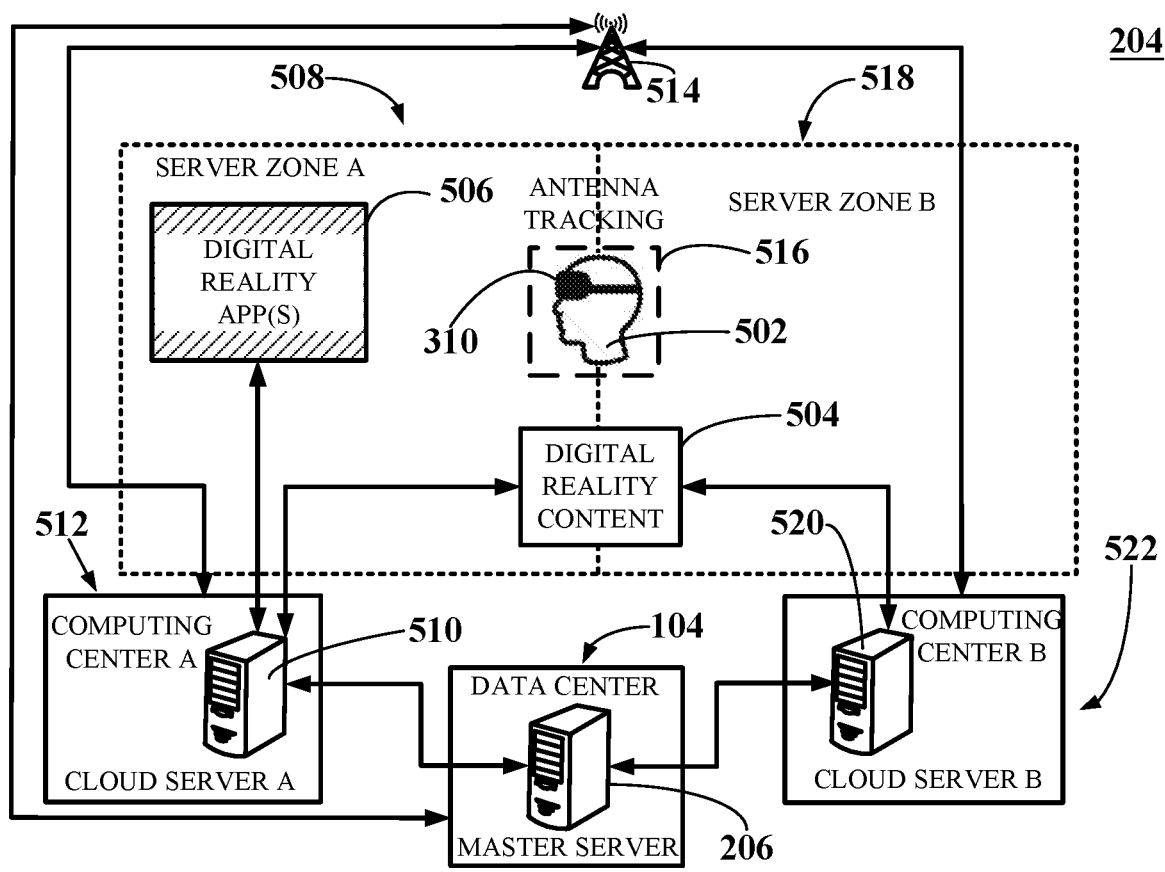

In FIG. 5C, when the user 502 is in-between server zones, such as between server zone A 508 and server zone B 518, the master server 206 may start retrieving part of digital reality data from cloud server A 510, synchronizing the retrieved data, and sending the data to cloud server B 520. In this embodiment, since the user 502 is not fully in server zone A 508 nor is the user in server zone B 518, the computational and rendering tasks may be partially carried out by both cloud server A 510 and cloud server B 520, maximizing QOS for the user 502.

Figure 5D:
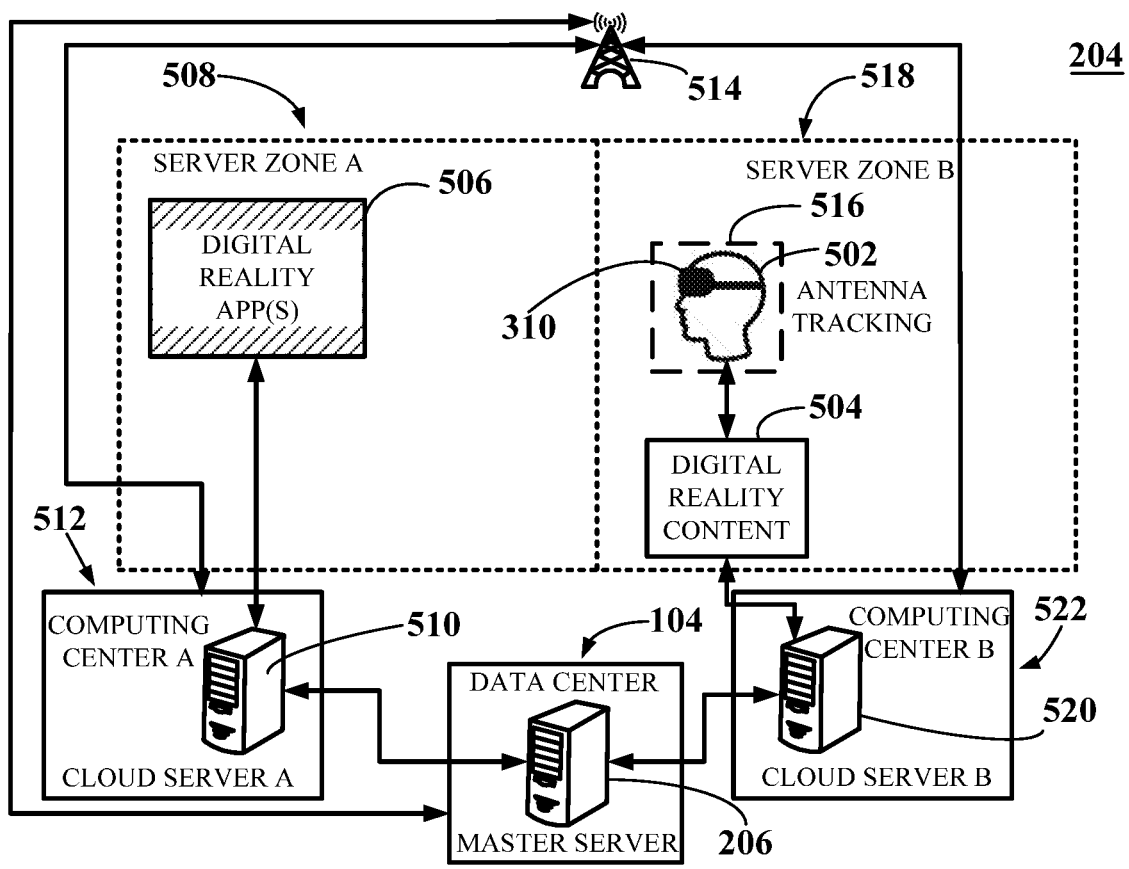

In FIG. 5D, when the user 502 has moved fully into server zone B 518, synchronized CC 204 completely performs a server hopping from cloud server A 510 to cloud server B 520. More specifically, when the user 502 has moved completely into server zone B 518, the master server 206 starts retrieving all digital reality data from digital reality application 506 via cloud server A 510, synchronizes the digital reality data, and sends the data to cloud server B 520. Cloud server B 520 then computes and renders the digital reality data so that the user 502 may keep receiving the digital reality content 504 when located in server zone B 518.

Figure 5E:
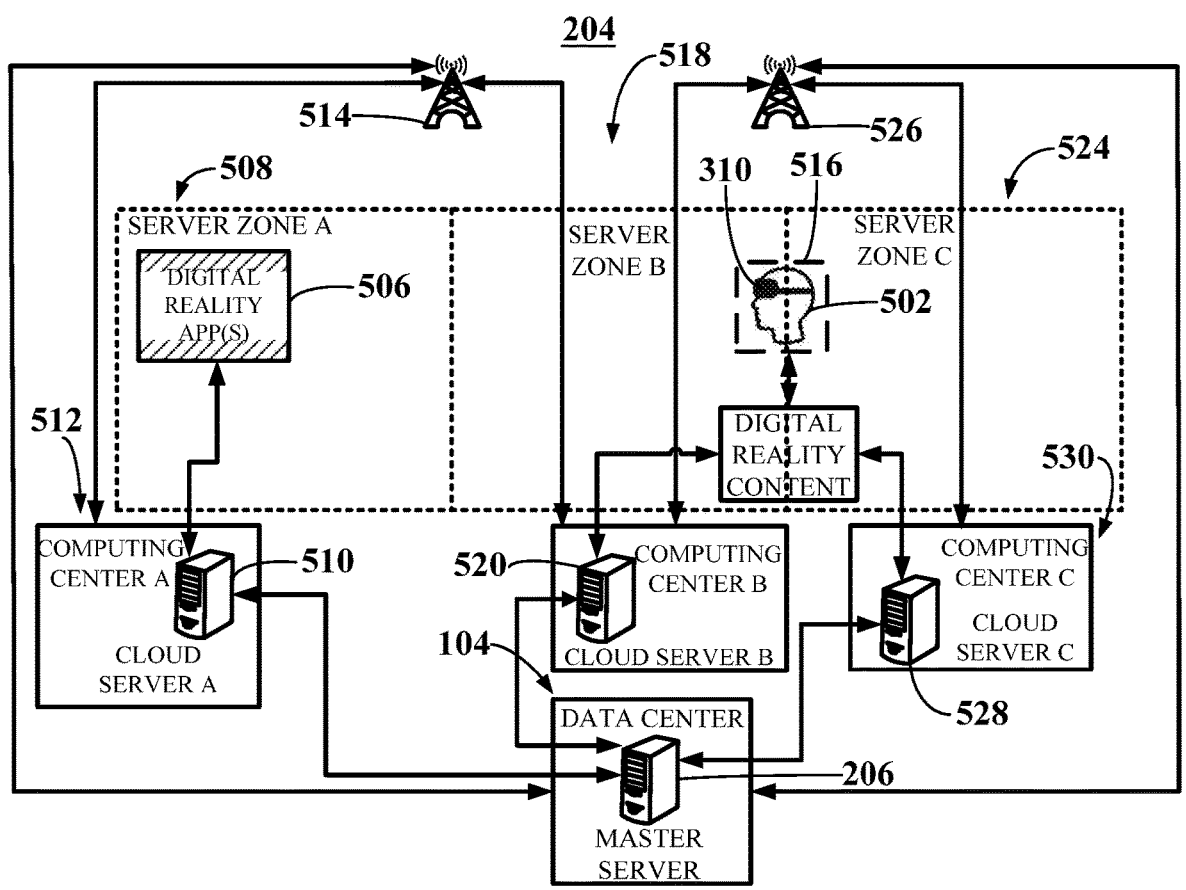

In FIG. 5E, in case of the user 502 moving close or into a server zone C 524 in areas that may be partially covered by one or more antennas A 514 and one or more antennas B 526, then the server zone servicing is performed partially by both antennas A 514 and antennas B 526. Additionally, the digital reality content 504 is retrieved and synchronized by the master server 206 from cloud server A 510 and is partially rendered and computed by both cloud server B 520 from CC B 522 and cloud server C 528 from a CC C 530.

Figure 5F:
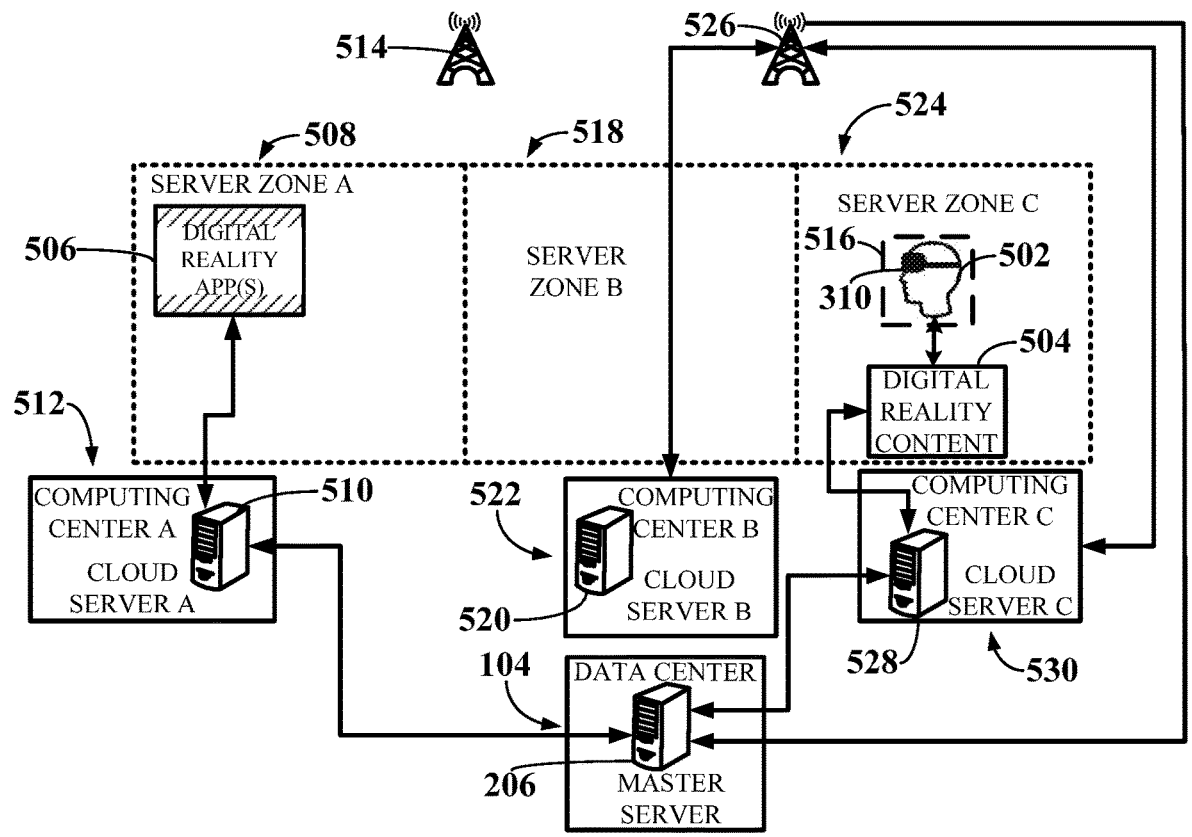

Afterwards, in FIG. 5F, in case of the user 502 moving fully into server zone C 524, e.g., in an area covered solely by the one or more antennas B 526 and by the cloud server C 528, then the server zone servicing is performed only by the one or more antennas B 526, and the digital reality data computing and rendering is performed solely by cloud server C 528.

In some embodiments, synchronized CC 204 may include additional, fewer, or differently arranged components than those described above.

Figure 6A:
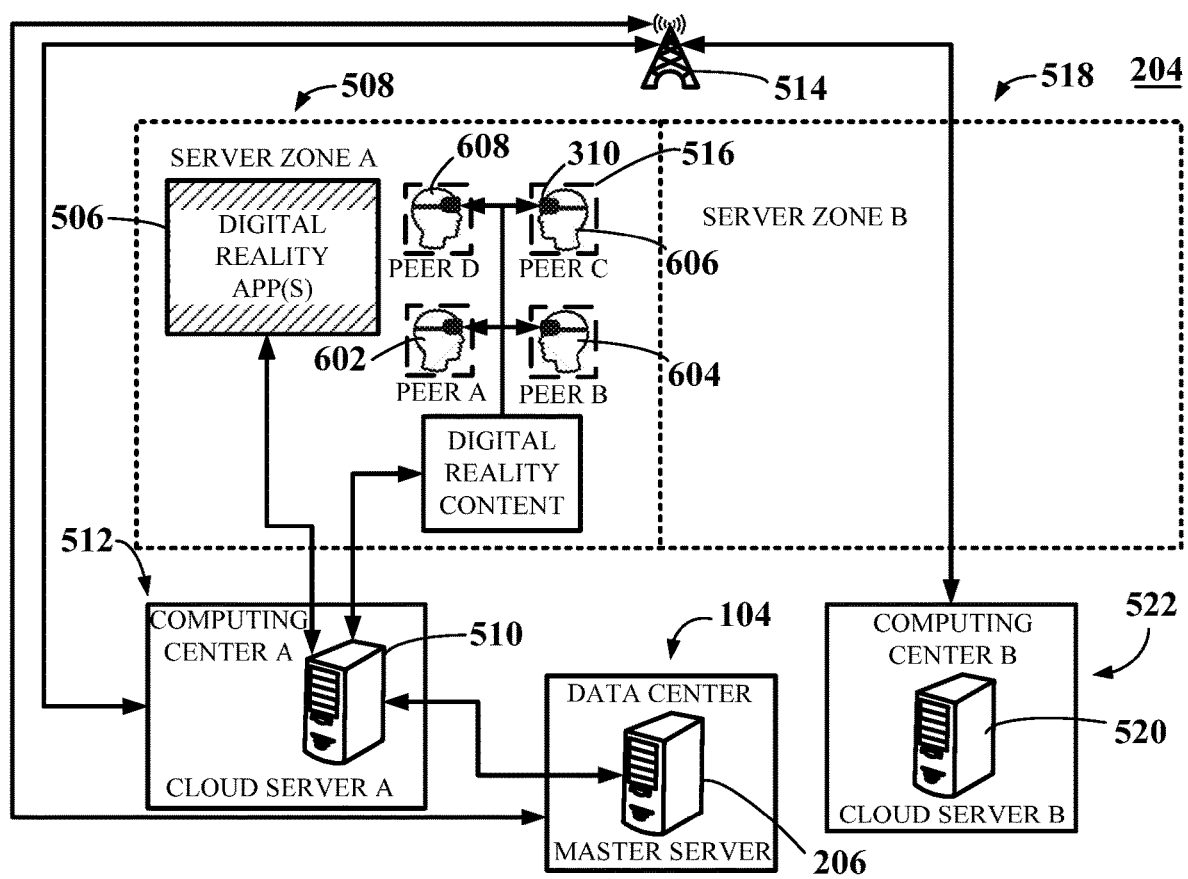
FIGS. 6A-C depict schematic representations of a system of the current disclosure enabling a continuous location-based computing and rendering service through a super-peer device, according to an embodiment.
Figure 6B:
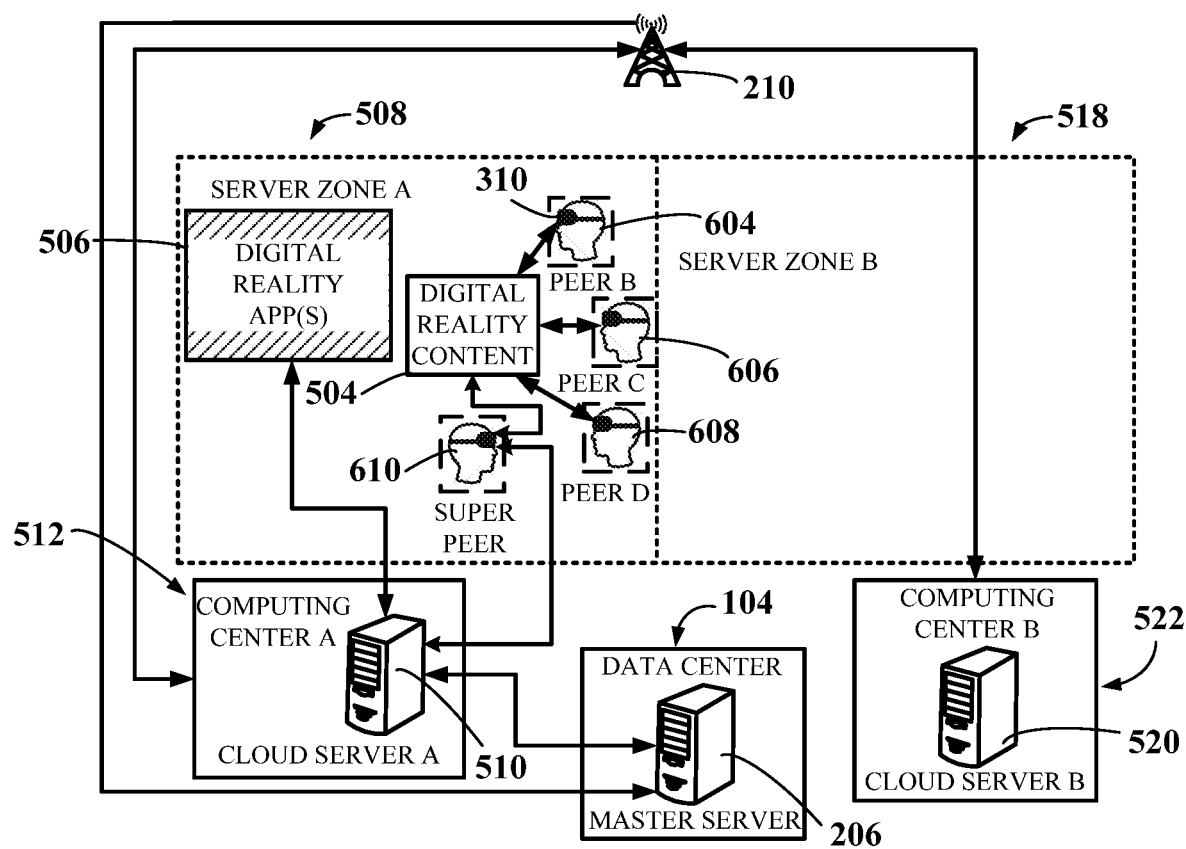
Figure 6C:
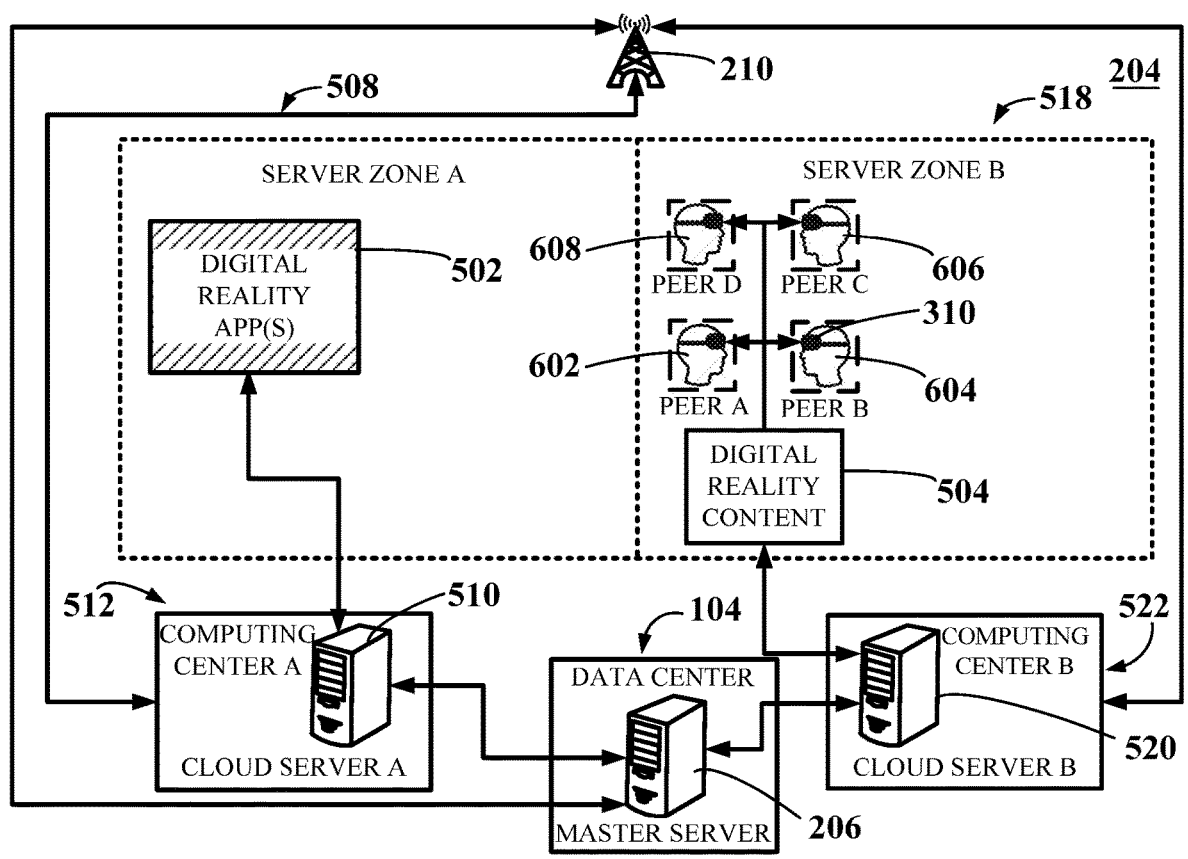

FIGS. 6A-6C depict an architectural diagrams illustrating a embodiments of a CC 202 configured to enable continuous location-based computing and rendering services through assignment of super-peer devices. The system of FIGS. 6A-C may include similar elements as those of the systems of FIGS. 1-5F, and may therefore contain the same or similar reference numbers.

Generally, computing and rendering through super-peer devices may decrease hardware and network demands for antennas and cloud servers and increase the QOS and service capacity of the system. Utilizing super-peer devices may as well improve security of the system, since access to cloud servers may be performed by only one or a low number of devices, minimizing cyber-threats to the cloud servers that may be increased from access by more devices.

In some embodiments, computing and rendering through super-peer devices may be performed as a way to improve QOS when the QOS is below a certain threshold. In other embodiments, computing and rendering through super-peer devices may be performed as a way to optimize the computing power and system bandwidth within a synchronized CC 204 without being necessarily tied to specific QOS thresholds.

In FIG. 6A, four peers, peer A 602, peer B 604, peer C 606, and peer D 608, receive and interact with digital reality content 504 retrieved from one or more sources, such as one or more digital reality applications 506. The digital reality data that generates the digital reality content 504 is computed and rendered by a cloud server, such as cloud server A 510, and viewed by the peers through a digital reality device 310 used by each peer. The digital reality device 310 is continuously being tracked 516 by one or more antennas 210.

The one or more antennas 514, which are constantly tracking 516 digital reality devices 310, may send location data of the digital reality devices 310 to the master server 206 located in a DC 104. The master server 206 may send instructions to a respective cloud server, to perform computations and rendering of digital reality content 504 depending on which server zone the user 502 is located in. For example, as viewed in FIG. 6A, the peers are still located in server zone A 508, therefore the master server 206 instructs cloud server A 510 to compute and render the digital reality content 504 for the peers.

In FIG. 6B, the four peers have changed location. More specifically, peer B 604, peer C 606, and peer D 608 are now farther away from the cloud server A 510, whereas peer A has remained in a location relatively close to the cloud server A 510. At that moment, the master server 206 assigns peer A as a super peer 610. The super peer 610 then starts aggregating and distributing the digital reality content 504 to peer B 604, peer C 606, and peer D 608. Likewise, any input received from peer B 604, peer C 606, and peer D 608 gets sent back to the cloud server A 510 through the super peer 610. The cloud server A 510 then sends the data to the digital reality application, which receives the input data to control application execution or to update the current operating state of the application, and then sends the output data back to the super peer 610 through the cloud server A 510. The super peer 610 then aggregates the data and sends it to the respective peers.

In some embodiments, the cloud server, such as cloud server A 510, the super peer 610 and the other peers (peer B 604, peer C 606, and peer D 608), all partially perform certain computational and rendering tasks for the digital reality data that is viewed as digital reality content 504. For example, the cloud server A 510 may receive the digital reality data from the digital reality applications 506, perform certain rendering and computational tasks, and send the pre-rendered data to the super peer 610. The super peer 610 may thereafter perform other lightweight computational and rendering tasks, and may aggregate and distribute the data to the other peers, which may finally perform final, lightweight computations and rendering operations on the digital reality data.

In other embodiments, heavier or lighter computational and rendering operations may be performed by one or more of the cloud servers, the super peer 610, and the rest of the peers. In these embodiments, heavier computational and rendering operations by one or more elements may translate into lighter computational and rendering operations by the other elements. Likewise, lighter computational and rendering operations by one or more elements may translate into heavier computational and rendering operations by the rest of the elements. For example, heavier computational and rendering operations performed by the cloud server may translate into lighter computational and rendering operations to be performed by the super peer 610 and by the rest of the peers.

In FIG. 6C, the four peers: peer A 602, peer B 604, peer C 606, and peer D 608, have completely moved into server zone B 518, disconnecting the super peer. In this case, the four peers are close enough to the cloud server B 520 and can suitably receive and engage with digital reality content 504 computed and rendered by cloud server B 520.

FIGS. 7A-7D depict block diagrams of a method 700 for enabling a real-time responsive and continuous location-based services in three-dimensional space when server-hopping or super peer devices may be required, according to an embodiment. The method 700 may be implemented in a system such as the systems detailed in FIGS. 1-6C.

Figure 7A:
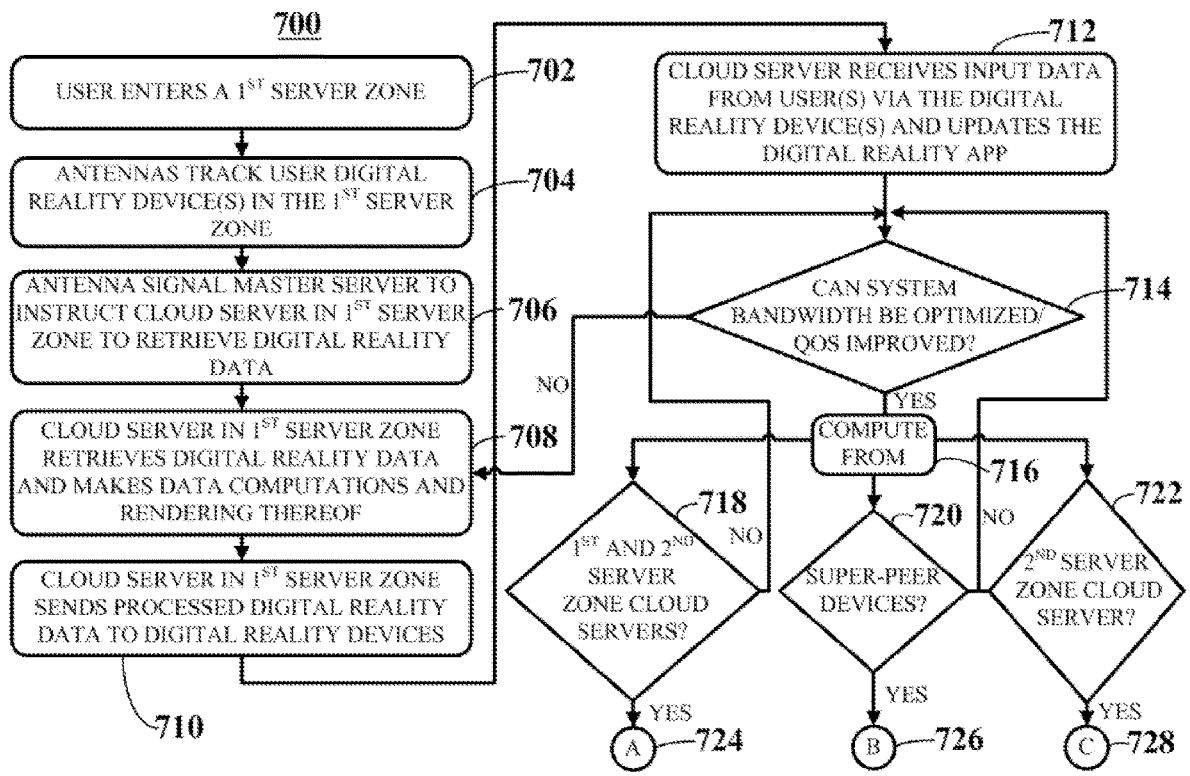
FIGS. 7A-D depict block diagrams of a method for enabling real-time responsive and continuous location-based services in three-dimensional space when server-hopping may be required, according to an embodiment.

As seen in FIG. 7A, method 700 may begin when one or more users enter a first server zone (e.g., a server zone A 508 from FIGS. 5A-F) as seen in step 702. Entering a first server zone may involve physically moving into a geographical zone that is covered by the cloud server of the first server zone. Then, in step 704, one or more antennas start tracking the one or more user digital reality devices in the first server zone.

Afterwards, in step 706, the one or more antennas may signal the master server in the first server zone to instruct the cloud server of the first server zone for retrieving digital reality data from the digital reality application. The cloud server of the first server zone then retrieves the digital reality data from the digital reality application in the first server zone and performs data computations and rendering tasks on the digital reality data, as seen in step 708. Subsequently, the cloud server of the first server zone sends the computed and rendered digital reality data to the one or more digital reality devices in the first server zone, as seen in step 710.

The cloud server of the first zone then proceeds by receiving input data from users via the one or more digital reality devices and then by sending the input data to the digital reality application, as seen in step 712, updating the application. Then, in check 714, method 700 checks whether the system bandwidth can be optimized or if the QOS can be improved. Several decisions may be taken thereafter depending on the QOS of the system and bandwidth optimization rules. For example, the method 700 can determine whether to compute and render 716 from a combination of a first and second server zone cloud servers, to compute and render from super-peer devices, or to compute and render from a cloud sever of a second server zone, as viewed in checks 718, 720, and 722 and continuing with connectors A 724, B 726 and C 728, respectively.

If the system bandwidth cannot be optimized and/or the QOS cannot be further improved, then the method 700 may go back to step 708 whereby the cloud server in the first server zone retrieves digital reality data from the digital reality application and makes data computations and rendering of the digital reality data. Thereafter, the process may continue until reaching check 714 again.

Figure 7B:
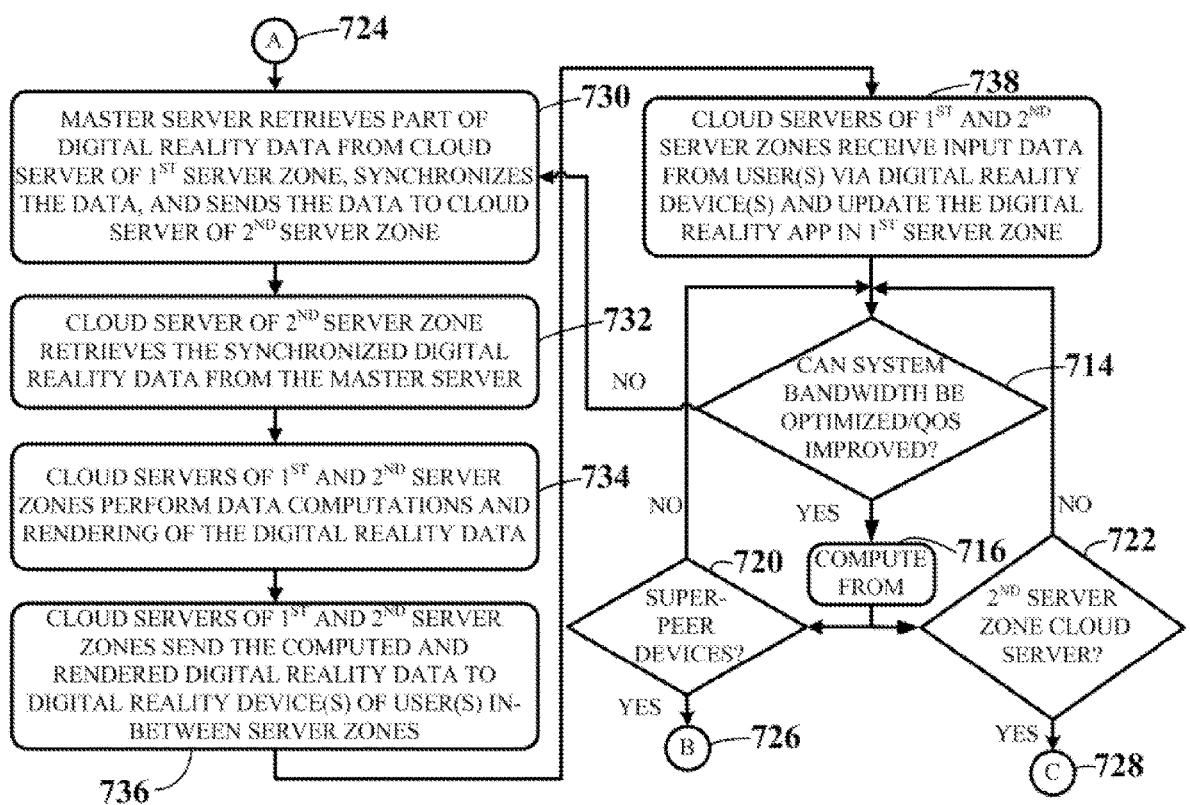

In FIG. 7B, method 700 determines to compute and render from a combination of a first and second server zone cloud servers. This may be performed when users are located in areas where coverage of only one cloud server may not be sufficient to provide suitable QOS, for example, when the users are located in-between server zones.

Starting with connector A 724, the master server retrieves part of the digital reality data from the cloud server of the first server zone, synchronizes the data, and sends the synchronized data to the cloud server of the second server zone, as seen in step 730. Then, in step 732, the cloud server of the second server zone retrieves the synchronized digital reality data from the master server. In step 734, the cloud servers of the first and second server zones perform data computations and rendering of the digital reality data, and, in step 736, send the computed and rendered digital reality data to the digital reality devices of users who are in-between server zones.

The cloud servers of the first and second server zones then receive input data from users via the digital reality devices and thereby update the digital reality application in the first server zone, as seen in step 738. Method 700 then verifies in check 714 whether the system bandwidth can be further optimized or the QOS further improved. In negative case, the method 700 goes back to step 730 and may continue the process. Otherwise, method 700 checks whether to render and compute 716 from super-peer devices or to render or compute from the cloud server of the second server zone, as seen in checks 720 and 722, respectively.

Figure 7C:
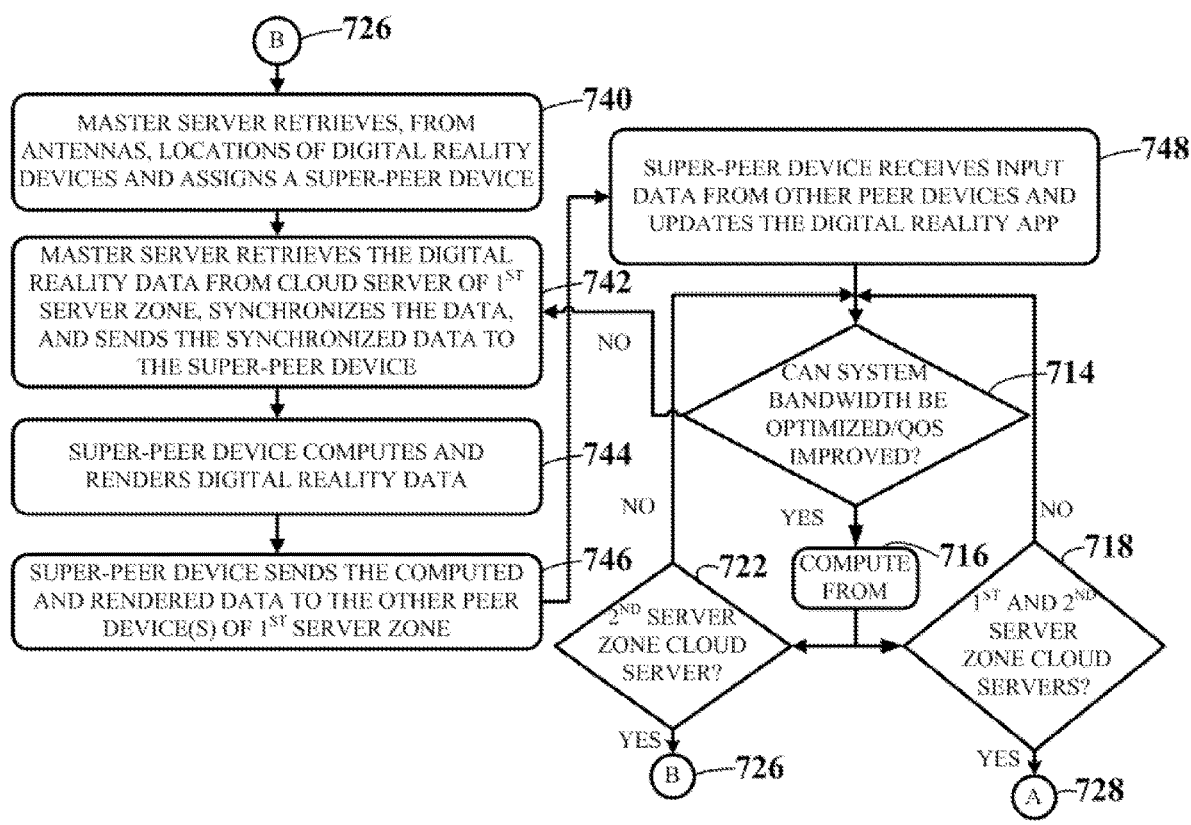

In FIG. 7C, method 700 determines to compute and render digital reality data from super-peer devices.

Starting with connector B 726, the master server retrieves, from the antennas, locations of digital reality devices and assigns a super-peer device based on bandwidth and QOS management rules, as seen in step 740. Then, in step 742, the master server retrieves the digital reality data from the cloud server of first server zone, synchronizes the data, and sends the synchronized data to the super-peer device. The super-peer device then performs data computations and rendering of the digital reality data, as viewed in step 744, and then sends the computed and rendered digital reality data to the other peer devices of the first server zone, as viewed in step 746. The super-peer device receives input data from the peer devices and thereby updates the digital reality application, as seen in step 748.

Method 700 then verifies in check 714 whether system bandwidth can be further optimized or the QOS further improved. In negative case, the method 700 goes back to step 742 and may continue the process. Otherwise, method 700 checks whether to compute and render 716 from cloud server of second server zone, or to compute and render 716 from first and second server zone cloud servers, as seen in checks 722 and 718, respectively.

Figure 7D:
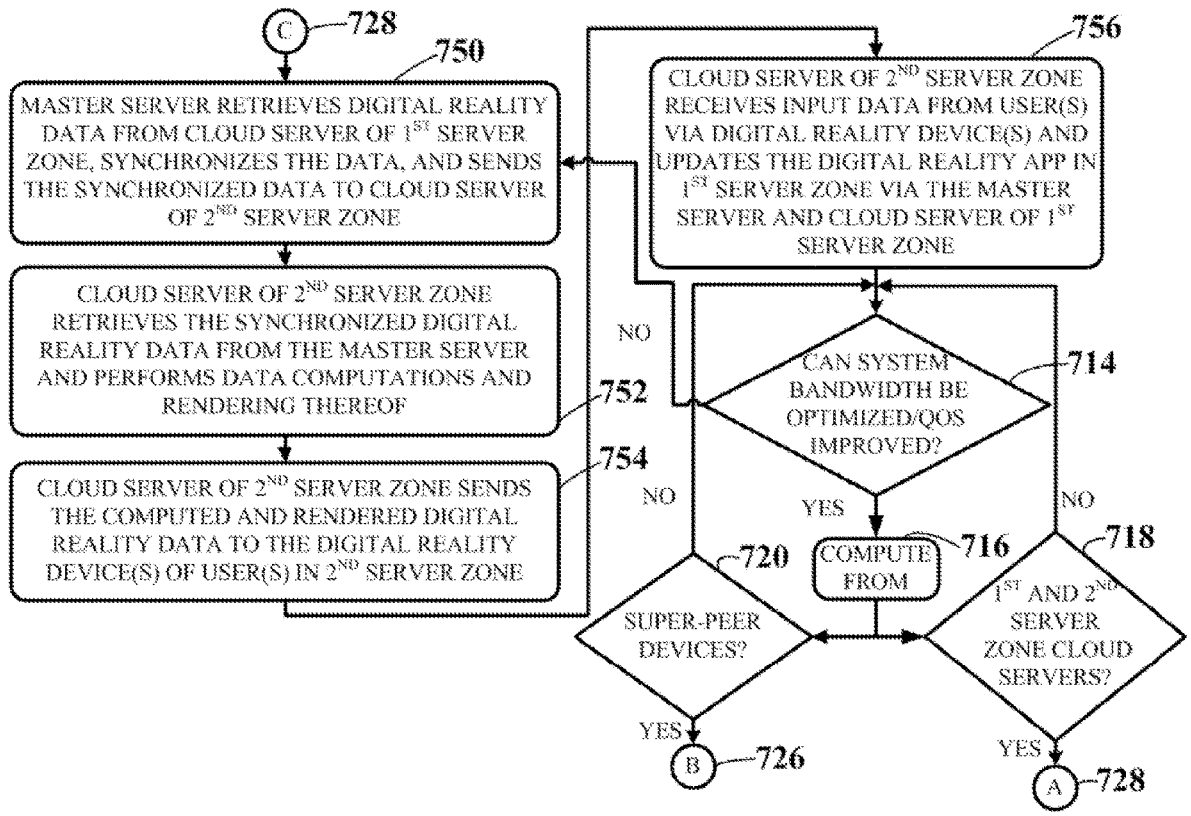

In FIG. 7D, method 700 determines to compute and render digital reality data by the cloud server of the second server zone. This may be performed when one or more users who are receiving and interacting with digital reality content move fully into the second server zone, so the QOS may be highest when computing and rendering from the cloud server of the second server zone.

Starting in connector C 728, the master server retrieves digital reality data from the cloud server of the first server zone, synchronizes the data, and sends the synchronized data to the cloud server of the second server zone, as seen in step 750. The cloud server of the second server zone then retrieves the synchronized digital reality data from the master server and makes data computations and rendering of the digital reality data, as seen in step 752. Afterwards, the cloud server of the second server zone sends the rendered digital reality data to the one or more digital reality devices of users in the second server zone, as seen in step 754. Then, in step 756, the cloud server of the second server zone receives input data from the one or more users via the one or more digital reality devices and thereby updates the digital reality application in the first server zone via the master server.

Method 700 then verifies in check 714 whether system bandwidth can be further optimized or the QOS further improved. In negative case, the method 700 goes back to step 750 and may continue the process. Otherwise, method 700 checks whether to compute and render from a combination of first and second server zone cloud servers, or from super-peer devices, as seen in checks 718 and 720, respectively.

Figure 8:
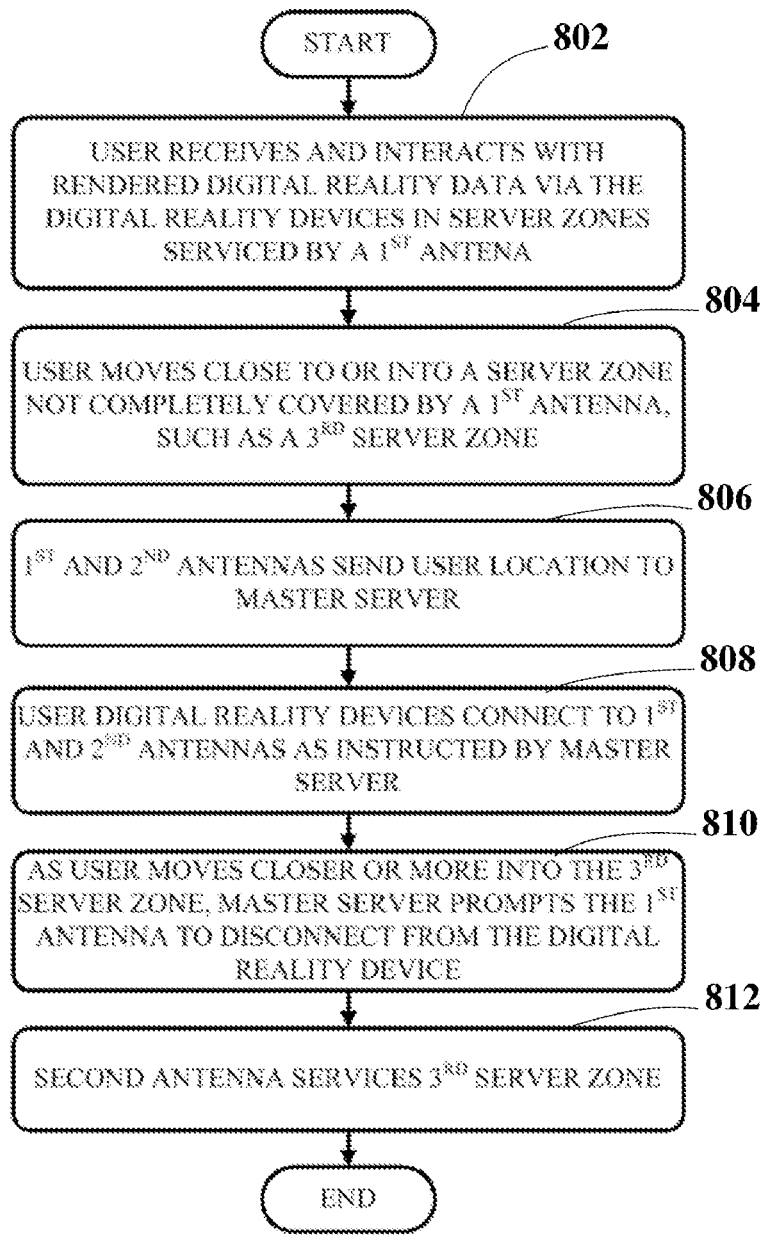
FIG. 8 depicts a block diagram of a method for enabling real-time responsive and continuous location-based services in three-dimensional space when antenna-hopping may be required, according to an embodiment.

FIG. 8 depicts a block diagram of a method 800 for enabling real-time responsive and continuous location-based services in three-dimensional space when antenna-hopping may be required, according to an embodiment. In some embodiments, antenna-hopping may be required when users have moved to toward areas within server zones where data from antennas may be weaker.

Method 800 may start when one or more users receive and interact with rendered digital reality data via the digital reality devices in server zones serviced by a first antenna (e.g., server zone A 508 and/or server zone B 518 in FIGS. 5A-5F), as seen in step 802. Then, in step 804, the one or more users move close to or into a server zone not completely covered by a first antenna (e.g., server zone C 524 in FIGS. 5E-5F). In step 806, the first and/or second antennas send user locations to the master server. Then, the master server instructs the user digital reality devices to connect to the first and second antennas, as seen in step 808.

Subsequently, as the user moves closer to the third server zone, the master server prompts the first antenna to disconnect from the digital reality device, as seen in step 810. Finally, the second antenna services the third server zone alone, as seen in step 812. In this case, the digital reality devices are solely connected to the second antenna and have completely been disconnected from the first antenna.

Figure 9:
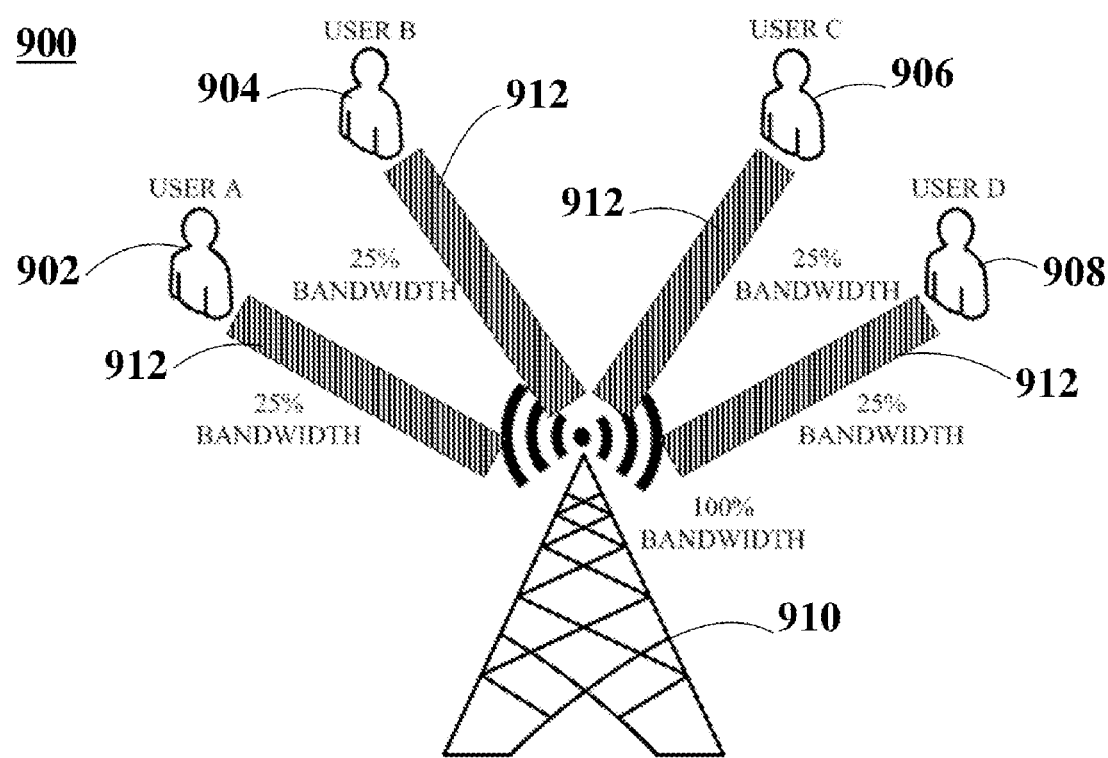
FIG. 9 depicts a diagram of flat network bandwidth slicing, according to prior art.

FIG. 9 depicts a diagram of flat network bandwidth slicing 900, according to prior art.

Typically, 4G bandwidth (i.e., the width of frequencies users may send and receive on), which uses the Long-Term Evolution (LTE) standard for high-speed wireless communication, is critical in supporting high speed and a high number of users.

A method typically adopted for multiplexing users in wireless communication is called orthogonal frequency-division multiple access (OFDMA). In OFDMA, simultaneous access by plural mobile stations, or client devices, is realized by assigning a subset of many subcarriers pre-defined by the OFDMA scheme to each client device. In the OFDMA scheme, it is necessary to perform assignment of subcarriers to be used for data communication before data transmission is performed. For example, in a cellular wireless system adopting the OFDMA scheme, a base station (BS), such as antennas 910, determines subcarrier assignments and signals subcarrier assignment information to client devices through a dedicated control information channel.

For data transmission on downlink (i.e., from an antenna to a client device) the antenna first assigns subcarriers to each client device, depending on the amount of data to be transmitted to the client device. Subcarrier assignment information is signaled from the antennas to client devices simultaneously with or before data transmission through a control information channel. Using the subcarriers assigned to each client device, the antennas transmit data to each client device.

For data transmission on uplink (i.e., from a client device to an antenna), each client device first signals a data transmission request and information about the amount of data to be transmitted to the antenna. The antenna assigns subcarriers to each client device based on the data transmission request from the client device. Subcarrier assignment information is signaled from the antenna to the client device through the control information channel. After that, each client device knows the subcarriers on which it is allowed to transmit data from the subcarrier assignment information signaled by the antenna 910 and transmits data based on this information.

In this way, in OFDMA, information on subcarrier assignments to each client device, determined by the antennas, is shared across the antennas and each client device, which thereby realizes data communication in which adaptive bandwidth allocation is performed depending on the amount of transmission.

Despite the benefits of OFDMA, usage of the whole frequency spectrum may not be optimized with the current bandwidth allocation. For example, in some occasions, users may be engaged in bandwidth consuming activities while other users may not, but still, all users may at all times be receiving a similar, not necessarily optimal amount of data and bandwidth frequencies. FIG. 9 illustrates this example showing four users, user A 902, user B 904, user C 906, and user D 908. Each user has been assigned specific subcarriers by antennas 910 that allow them to receive data without mutually interfering with each other's subcarriers. Nevertheless, users A 902 and B 904 may not be using their client device while users C 906 and D 908 may be doing so, and yet, each user may receive a similar bandwidth slice 912. This may be due to an insufficiently adaptive subcarrier assignment because these assignments prioritize the number of client devices connected to the antennas rather than the amount of data required, in addition to disregarding other factors, as may be further detailed in FIG. 10.

Figure 10:
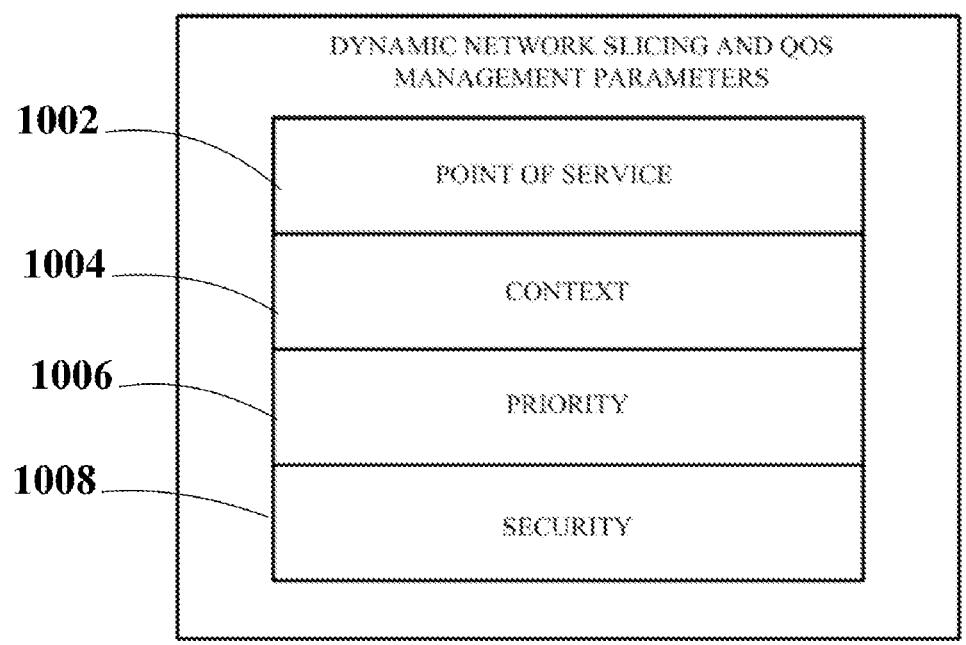
FIG. 10 depicts several dynamic network slicing and QOS management parameters, according to an embodiment.

FIG. 10 depicts dynamic network slicing and QOS management parameters 1000, according to an embodiment.

Dynamic network slicing and QOS management is referred herein as the ability to tailor a set of functions for use of the network for each client device. For example, dynamic network slicing and QOS management may determine the optimum beamforming, steering of antennas, server hopping, antenna hopping, super peer assignment, network functionality needed by client devices, and optimum number of subcarriers and total bandwidth per client devices required to optimize QOS. Dynamic network slicing and QOS management is performed by the digital reality VRAN 306 in the cloud server described in reference to FIG. 3A, and may use data and instructions from the experience OS (e.g., experience OS 308 of FIG. 3A) that may be required to perform these functions.

According to an embodiment, the dynamic network slicing and QOS management is performed by using machine learning algorithms. Generally, during machine learning, a programmer provides a computer with a set of sample data and a desired outcome, and the computer generates its own algorithm on the basis of those data that it can apply to any future data. Thus, in the current disclosure, a set of dynamic network slicing and QOS management parameters 1000 along with data sets corresponding to each parameter and desired outcomes may be provided for training the machine learning algorithms. These algorithms may go through numerous iterations during training in order to generate trained machine learning models that may be used when performing dynamic network slicing and QOS management. The training and inference may be performed by a processor in the cloud server 208.

As shown in FIG. 10, these dynamic network slicing and QOS management parameters 1000 may include, amongst others, a point of service 1002, context 1004, priority 1006, and security parameters 1008.

Point of service 1002 refers to the location of a client device as related to the distance between the client device and an antenna. More specifically, the farther a client device goes from the antenna, because of signal attenuation, the more subcarriers that the user may need to be assigned in order to compensate for this attenuation.

Context 1004 includes data related to the direct or indirect environment of a client device and an antenna, and which may include micro-context and macro-context, as described with respect to FIG. 3B. For example, if a client device is receiving network signals inside of a building, relevant micro-context data may include building materials, wall thicknesses, and window locations, as well as data on the structures around the antennas, all of which may be relevant during processing by the digital reality VRAN to performing dynamic network slicing and QOS management. Further in this example, the digital reality VRAN may determine how to direct network signals such that the QOS may be optimized, preventing or diminishing to the least possible any interception from structures (e.g., buildings) around the antennas or around the client devices, and directing the signals through less reflective materials such as windows or thinner walls in order to reach a client device with an optimized QOS, instead of sending the network signals through thicker walls or walls made of materials where network signals may have difficulties penetrating.

The term "service context" refers to the actual applications being used by a user or users in the vicinity. As each application consumes bandwidth, service context may provide the cloud server with valuable information required to assess provisioning of network signals to each client device.

Priority 1006 refers to the relative importance that certain users or entities may have with respect to the service providers, which may be determined by the type of contract agreed by the different parties. The type of priority may influence the context rankings and thus the amount of bandwidth that users may receive for each type of service.

Security parameters 1008 relate to a level of protection that may be required for specific users to defend against cyber-risks. Security parameters 1008 may translate into various security measures such as data encryption, firewalls, Virtual Private Networks (VPNs), etc. The level of security may, like priority 1006, be determined by the type of contract.

FIG. 11 shows sample service context parameters 1100 that may be taken into account when applying dynamic network slicing and QOS management, according to an embodiment. Service context parameters 1100 include several parameters 1102 with a respective ranking 1104 that may be defined by a user profile, as will be further explained in FIG. 12. For example, the more bandwidth a specific application requires, the higher the ranking 1104, translating into a greater amount of subcarriers allocated for these users. Likewise, users generally employing applications requiring lower bandwidths are provided lower amount of subcarriers.

Examples of parameters 1102 may include calling 1106, streaming videos 1108, sending and receiving short message service (SMS) 1110, downloading/uploading files 1112, and downloading/uploading videos 1114, with an example ranking 1104 of C 1116, A 1118, E 1120, D 1122, and B 1124, assigned respectively to each parameter 1102.

Rankings 1104 assigned to each parameter 1102 determine the network slice and thus, the bandwidth, to be assigned to each user according to the user profile. In the example of FIG. 11, each parameter 1102 has been assigned a letter of the alphabet, with an ascending order representing a lower bandwidth allocated for each parameter 1102 depending on the nature of the parameter 1102. For example, as seen in FIG. 11, a ranking 1104 of A 1118 indicates a higher amount of bandwidth allocated to the user for the category of video streaming videos 1108; a ranking 1104 of B 1124 indicates lower amount of bandwidth allocated to the user for the category of downloading/uploading videos 1114, but higher than categories C-D; a ranking 1104 of C 1116 indicates a lower amount of bandwidth allocated to the user for the category of calling 1106 when compared to categories A-B, but higher than categories D-E; a ranking 1104 of D 1122 indicates a lower amount of bandwidth allocated to the user for the category of downloading/uploading files 1112 when compared with categories A-C, but higher than category E; and a ranking 1104 of E 1120 indicates a lower amount of bandwidth allocated to the user for sending and receiving SMSs 1110.

Figure 12:
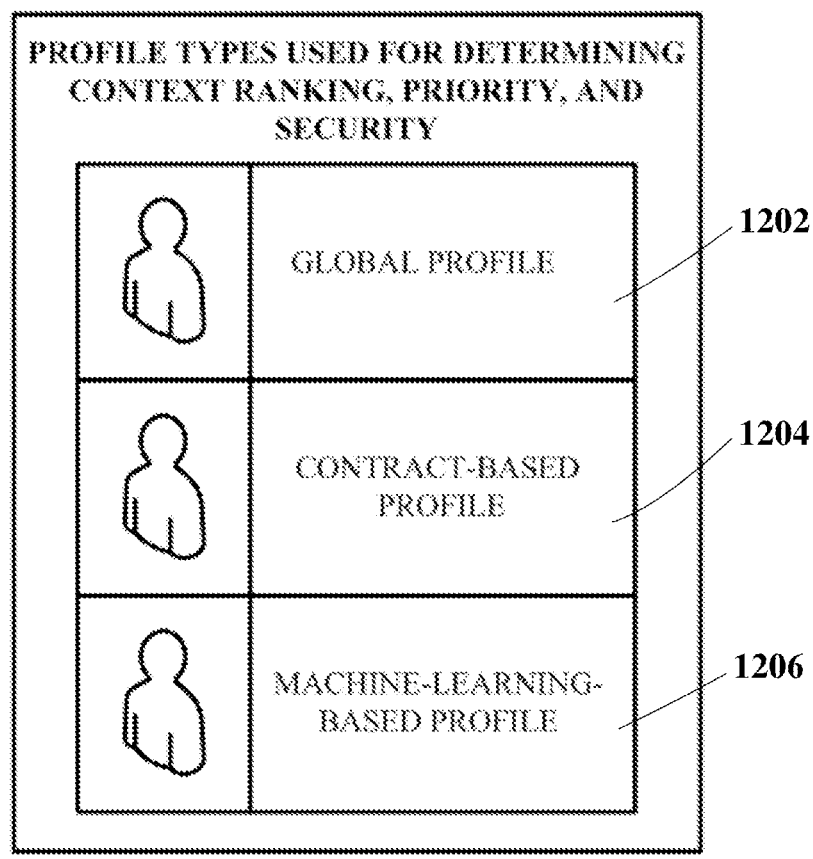
FIG. 12 depicts profile types that may be used for determining a priority index included in the service context parameters, according to an embodiment.

FIG. 12 shows sample profile types 1200 used for determining the service context ranking 1104 of FIG. 11, according to an embodiment.

In the example of FIG. 12, profile types 1200 include a global profile 1202 (e.g., the profile including parameters 1102 and the ranking 1104 of FIG. 11); a contract-based profile 1204; and a machine-learning-based profile 1206.

The global profile 1202 may be a generic profile used for average users. Thus, the service context ranking 1104 may be obtained through statistical data reflecting the usage rate of each context parameter. In some embodiments, a global profile 1202 may also be applied geographically (city, state, country, region, etc.). More specifically, ranking values for context parameters may be calculated geographically, and if it is determined that significant differences exist between the values, then a different geographical global profile 1202 may be determined and applied.

The contract-based profile 1204 may determine the adjustment of the context ranking values for each context parameter according to the terms stipulated in a contract between the user and the service provider. Thus, for example, a low-data user that may not engage frequently in video-streaming, uploading/downloading videos, or downloading/uploading files, may decide to have more bandwidth (and thus higher context ranking values) for calling and texting.

The contract-based profile 1204 may also determine other dynamic network slicing and QOS management parameters 1000 described in FIG. 10, such as priority 1006 and security 1008. For example, high-ranking government officials may be provided a higher priority 1006 and security 1008 than a global profile user, and thus may be provided with higher amounts of bandwidth for each context parameter as well as higher security measures to prevent endangering potential high-level information.

The machine-learning-based profile 1206 may determine context rankings through usage of machine-learning techniques through, for example, instructions and data implemented in the digital reality VRAN 306 of FIG. 3A, and may optimize network traffic based on a context zone determined by an event. For example, if there is a sports game taking place in a stadium, and the majority of users are recording the video and doing live video-streaming, the machine-learning techniques may determine a high service context ranking value for that particular group of users and may provide users accordingly with necessary bandwidth. In other embodiments, the machine-learning-based profile 1206 may also be used to determine individual users' profile and compute a ranking value accordingly.

Figure 13:
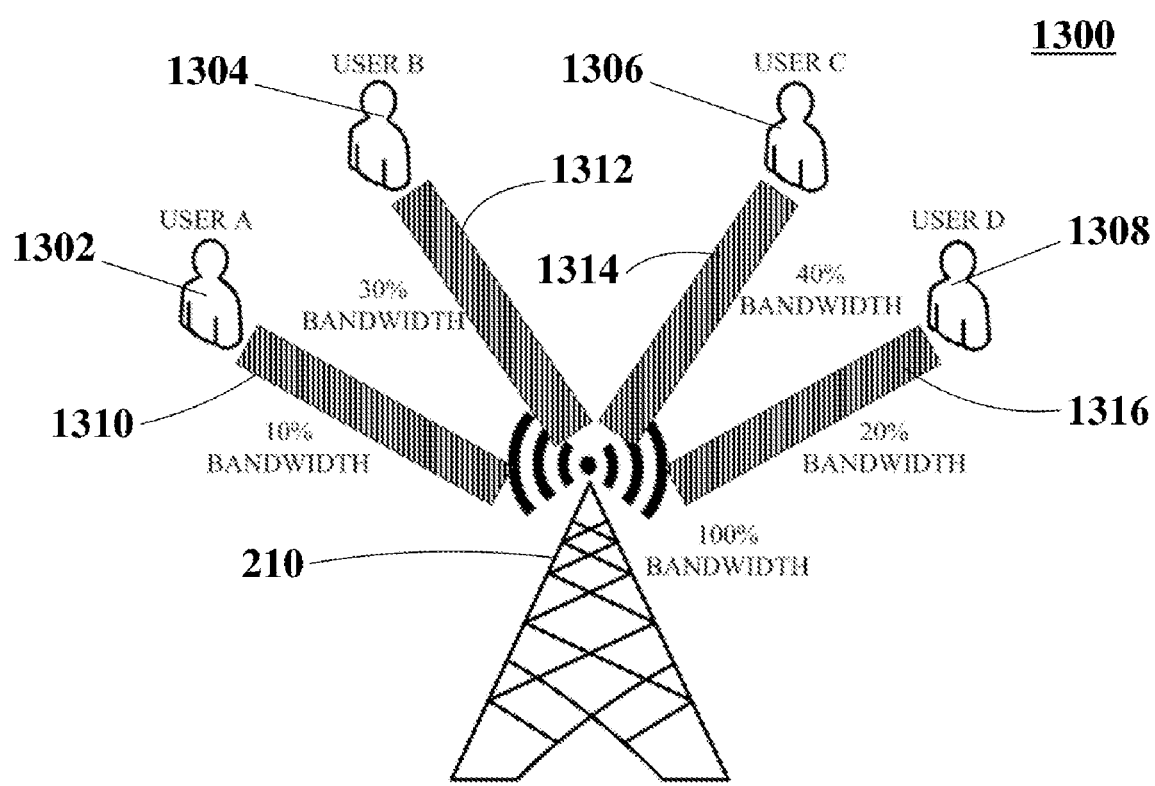
FIG. 13 depicts an exemplary diagram of a dynamic network slicing, according to an embodiment.

FIG. 13 shows a diagram of an exemplary dynamic slicing 1300 of the current disclosure, according to an embodiment.

In FIG. 13, user A 1302, user B 1304, user C 1306, and user D 1308 receive 10% bandwidth 1310, 30% bandwidth 1312, 40% bandwidth 1314, and 20% bandwidth 1316, respectively, from one or more antennas 210. Thus, although 100% of the bandwidth is still allocated to all users in the system, each user receives an amount of bandwidth according to the user's service context, point of service, priority, and security, as stated with reference to FIG. 10.

Figure 14:
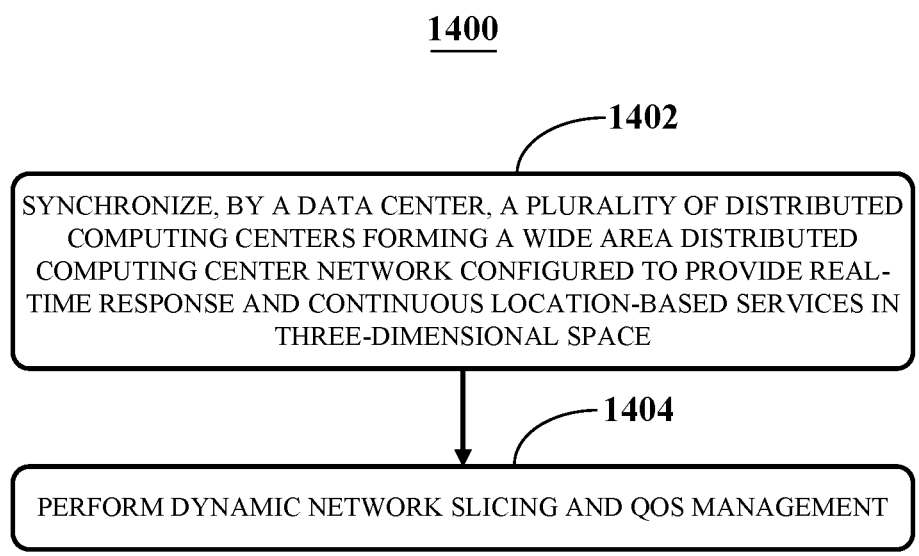
FIG. 14 depicts a block diagram of a method for optimizing bandwidth and QOS, according to an embodiment.

FIG. 14 shows a block diagram of a method 1400 for optimizing bandwidth and QOS in a synchronized CC, according to an embodiment. Method 1400 may be implemented in a system, such as the systems described in FIGS. 1-6C and FIGS. 11-13. More specifically, method 1400 may be implemented in the digital reality VRAN portion of the cloud servers, as described with reference to FIG. 3A.

Method 1400 may begin in step 1402 by synchronizing, by one or more mutually connected data centers, a plurality of distributed computing centers, forming a wide area distributed computing center network configured to provide real-time responsive and continuous (or substantially continuous, allowing for occasional network latency problems or service interruptions) location-based services in three-dimensional space. The method continues in step 1404 by performing, by the master servers, dynamic network slicing and quality of service management through management of the distributed computing centers.

Figure 15:
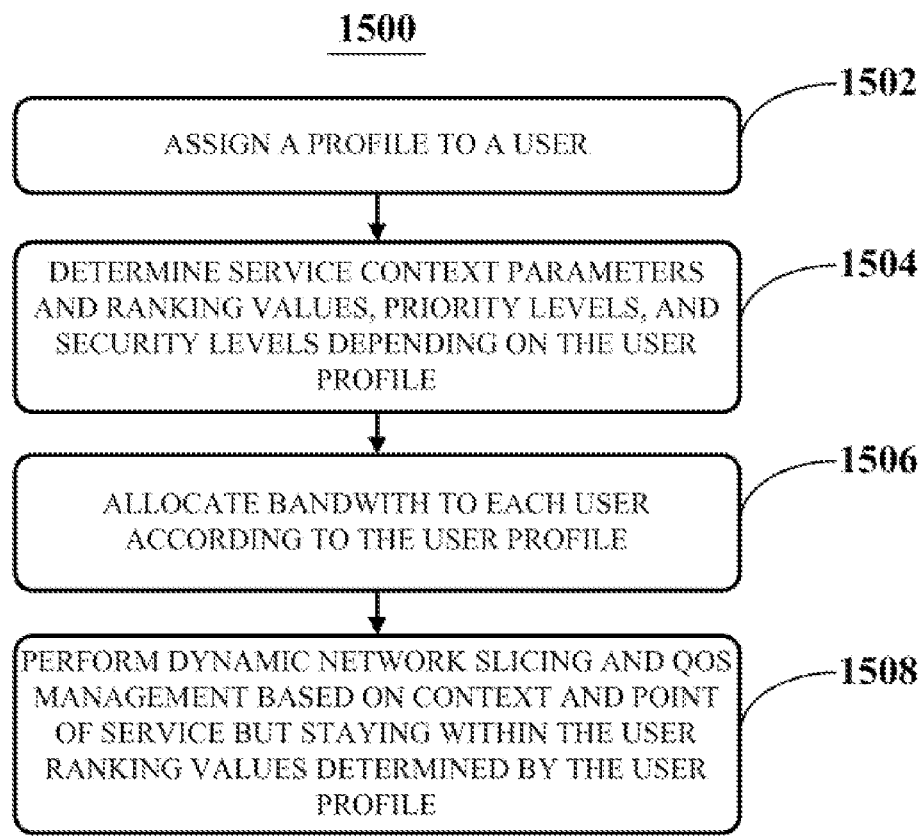
FIG. 15 depicts a block diagram of a method for performing dynamic network slicing and quality of service management.

FIG. 15 depicts a block diagram of a method 1500 for performing dynamic network slicing and quality of service management, according to an embodiment.

Method 1500 may begin in step 1502 by assigning users with a profile (e.g., a global profile 1202, a contract-based profile 1204, or a machine-learning-based profile 1206 of FIG. 12). User profile information as well as the service context parameters and ranking values, priority levels, and security levels are stored as a set of data and instructions in the experience OS of the cloud server.

In step 1504, the method 1500 continues by determining service context parameters and ranking values, priority levels, and security levels of the users depending on the user profiles. Then, in step 1506, the method continues by allocating bandwidth to each user according to the user profile (e.g., according to the service context parameters that are based on the user profile). Finally, method 1500 may end in step 1508 by dynamically managing network slicing and QOS based on context and point of service while staying within the user ranking values determined by the assigned user profile.

According to an embodiment, the dynamic network slicing and QOS management includes performing, at the digital reality VRAN of the cloud server, computations required to achieve an optimum beamforming, steering of antennas, server hopping, antenna hopping, super peer assignment, providing the correct network functionality needed by client devices, and optimum number of subcarriers and total bandwidth per client devices required to optimize QOS.

According to an embodiment, cloud servers or master servers store in memory a persistent virtual world system storing virtual replicas of real world elements that are updated based on multi-source sensory data captured by sensors mounted on client devices. The persistent virtual world system may further comprise purely virtual replicas not existing in the real world and applications. Yet further in this embodiment, the digital reality VRAN performs the dynamic network slicing and quality of service management based on data from the persistent virtual world system.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

The invention claimed is:

1. A wide area distributed computing center network system comprising:
   one or more data centers communicatively connected to each other and to a plurality of distributed computing centers comprising one or more cloud servers, the data centers being configured to synchronize the plurality of distributed computing centers, forming a wide area distributed computing center network configured to provide real-time responsive location-based services in three-dimensional space; wherein each data center comprises one or more master servers configured to perform dynamic network slicing and quality of service management through management of the distributed computing centers.

2. The system of claim 1, wherein the location-based services provided by the wide area distributed computing center network comprise one or more of real-time cloud computing of digital reality data, real-time rendering of digital reality data, real-time tracking of client devices, or real-time communication, or combinations thereof.

3. The system of claim 1, wherein the one or more cloud servers or the one or more master servers further comprise operating systems including a network operating system (NOS) configured to connect antennas to cloud servers and to the client devices; a digital reality virtual radio access network (VRAN) configured to perform the dynamic network slicing and quality of service management; and an experience operating system including data and instructions used by the digital reality VRAN in order to perform the dynamic network slicing and quality of service management.

4. The system of claim 3, wherein the one or more cloud servers or the one or more master servers store in memory a persistent virtual world system storing virtual replicas of real world elements that are updated based on multi-source sensory data captured by sensors mounted on client devices, and wherein the digital reality VRAN performs the dynamic network slicing and quality of service management based on data from the persistent virtual world system.

5. The system of claim 3, wherein the dynamic network slicing and quality of service management performed by the digital reality VRAN determines optimum beamforming, steering of antennas, server hopping, antenna hopping, super peer assignment, network functionality needed by client devices, and an optimum number of subcarriers and total bandwidth per client device, and wherein the dynamic network slicing and quality of service management are location-based services in the three-dimensional space.

6. The system of claim 3, wherein the dynamic network slicing and quality of service management performed by the digital reality VRAN is based on parameters comprising point of service, context, priority, and security.

7. The system of claim 1, wherein the quality of service management is performed by the one or more master servers based on:
   a user profile assigned to a user, the assigned user profile comprising one or more of a global profile, a contract-based profile, or an artificial intelligence-based profile; and
   service context parameters based on the assigned user profile, the service context parameters comprising ranking values, priority levels, and security levels; wherein the one or more master servers allocate bandwidth to each user according to the assigned user profile.

8. The system of claim 1, further comprising network connection antennas configured to provide network connection and tracking services to client devices, and wherein the network connection antennas comprise millimeter-wave (mmW) or combinations of mmW and sub 6 GHz communication systems.

9. A method of providing real-time responsive location-based services in three-dimensional space to client devices, the method comprising:
   synchronizing, by one or more mutually connected data centers, a plurality of distributed computing centers, wherein the distributed computing centers form a wide area distributed computing center network configured to provide real-time responsive location-based services in three-dimensional space, wherein each data center comprises one or more master servers, and wherein each of the distributed compute centers comprises one or more cloud servers; and
   performing, by the master servers, dynamic network slicing and quality of service management through management of the distributed computing centers.

10. The method of claim 9, wherein the location-based services provided by the wide area distributed computing center network comprise one or more of real-time cloud computing of digital reality data, real-time rendering of digital reality data, real-time tracking of client devices, or real-time communication, or combinations thereof.

11. The method of claim 9, wherein the one or more cloud servers or the one or more master servers comprise operating systems including a network operating system (NOS) configured to connect antennas to cloud servers and to the client devices; a digital reality virtual radio access network (VRAN) configured to perform the dynamic network slicing and the quality of service management; and an experience operating system including data and instructions used by the digital reality VRAN in order to perform the dynamic network slicing and the quality of service management.

12. The method of claim 11, wherein the one or more cloud servers or the one or more master servers store in memory a persistent virtual world system storing virtual replicas of real world elements that are updated based on multi-source sensory data captured by sensors mounted on client devices, and wherein the digital reality VRAN performs the dynamic network slicing and quality of service management based on data from the persistent virtual world system.

13. The method of claim 11, wherein the dynamic network slicing and quality of service management performed at the digital reality VRAN comprises one or more functions comprising determining optimum beamforming, steering of antennas, server hopping, antenna hopping, super peer assignment, network functionality needed by client devices, or an optimum number of subcarriers and total bandwidth per client devices required to optimize quality of service, or a combination of such functions, and wherein the dynamic network slicing and quality of service management are location-based services in the three-dimensional space.

14. The method of claim 13, wherein the server hopping performed by the master server comprises:
- receiving client device location data from antennas; and
- when a client device is located in a zone not entirely covered by a cloud server, instructing a cloud server nearest to the client device to compute and render digital reality data for the client device.

15. The method of claim 13, wherein the antenna hopping performed by the master server comprises:
- receiving client device location data from antennas; and
- when a client device is located in a zone not completely covered by an antenna, instructing one or more antennas nearest to the client device to perform tracking and data provisioning for the client device.

16. The method of claim 13, wherein the super peer assignment by the master server comprises:
- receiving client device location data from antennas;
- when a client device is located in a zone where quality of service and system computing power are not optimized, assigning one or more other client devices as super-peer devices for aggregating and distributing digital reality data for peer client devices; and
- dynamically adjusting the level of computational and rendering operations across the cloud servers, super peer devices, and other peer client devices.

17. The method of claim 11, wherein the dynamic network slicing and quality of service management is based on parameters including point of service, context, priority, and security.

18. The method of claim 9, wherein the dynamic network slicing and quality of service management comprises:
- assigning a profile to a user, the profile comprising one or more of a global profile, a contract-based profile, or an artificial intelligence-based profile;
- determining service context parameters and ranking values, priority levels, and security levels depending on the assigned user profile;
- allocating bandwidth to each user according to the assigned user profile; and
- dynamically managing network slicing and QOS based on context and point of service while staying within the user ranking values determined by the assigned user profile.

19. The method of claim 9, further comprising providing network connection antennas in order to provide network connection and tracking services to client devices, and wherein the network connection antennas comprise millimeter-wave (mmW) or combinations of mmW and sub 6 GHz communication systems.

20. One or more non-transitory computer readable-media having stored thereon instructions configured to cause one or more data centers communicatively connected to each other and to a plurality of distributed computing centers comprising one or more cloud servers to perform the steps of:
- synchronizing, by the one or more data centers, the plurality of distributed computing centers, wherein the one or more data centers comprise one or more master servers, and wherein the distributed computing centers form a wide area distributed computing center network configured to provide real-time responsive location-based services in three-dimensional space; and
- performing, by the master servers, dynamic network slicing and quality of service management through management of the distributed computing centers.

* * * * *